(12) United States Patent
Koh

(10) Patent No.: US 12,293,369 B2
(45) Date of Patent: May 6, 2025

(54) VALIDATING TRANSACTIONS ELECTRONICALLY USING PROOF OF RECEPTION VALIDATION PROTOCOL

(71) Applicant: Sean Koh, Fort Lee, NJ (US)

(72) Inventor: Sean Koh, Fort Lee, NJ (US)

(*) Notice: Subject to any disclaimer, the term of this patent is extended or adjusted under 35 U.S.C. 154(b) by 226 days.

(21) Appl. No.: 18/071,163

(22) Filed: Nov. 29, 2022

(65) Prior Publication Data

US 2023/0169510 A1 Jun. 1, 2023

Related U.S. Application Data

(60) Provisional application No. 63/400,226, filed on Aug. 23, 2022, provisional application No. 63/283,789, filed on Nov. 29, 2021.

(51) Int. Cl.
 *G06Q 20/40* (2012.01)
 *G06Q 20/38* (2012.01)

(52) U.S. Cl.
 CPC ..... *G06Q 20/4016* (2013.01); *G06Q 20/3825* (2013.01); *G06Q 20/3829* (2013.01); *G06Q 20/389* (2013.01); *G06Q 20/40145* (2013.01); *G06Q 2220/00* (2013.01)

(58) Field of Classification Search
 CPC ........... G06Q 20/4016; G06Q 20/3825; G06Q 20/3829; G06Q 20/389; G06Q 20/40145; G06Q 2220/00; G06Q 20/123; G06Q 40/04; G06Q 20/065; G06Q 20/02
 USPC .......................................................... 705/71
 See application file for complete search history.

(56) References Cited

U.S. PATENT DOCUMENTS

| | | | |
|---|---|---|---|
| 9,563,881 B2* | 2/2017 | Shao | G06Q 20/401 |
| 10,637,644 B1* | 4/2020 | Walters | H04L 9/0833 |
| 2009/0327142 A1* | 12/2009 | Shao | G06Q 20/02 |
| | | | 705/75 |
| 2017/0005804 A1 | 1/2017 | Zinder | |
| 2017/0132625 A1 | 5/2017 | Kennedy | |
| 2017/0352012 A1 | 12/2017 | Hearn et al. | |
| 2022/0321360 A1* | 10/2022 | Wahab | H04L 9/3252 |

OTHER PUBLICATIONS

Al-Sada et al., "Secure scalable blockchain for sealed-bid auction in energy trading." Presented at Proceedings of 2021 IEEE International Conference on Blockchain and Cryptocurrency (ICBC), May 3-6, 2021; IEEE, Jun. 2021, 6 pages.

(Continued)

*Primary Examiner* — Zeshan Qayyum
(74) *Attorney, Agent, or Firm* — Fish & Richardson P.C.

(57) ABSTRACT

In an example method, a distributed transaction network includes a first computing node and a second computing node. The second computing node receives a data record from the first computing node, including an indication of a proposed transaction, an indication of a transaction value associated with the proposed transaction, and an indication of a smart contract associated with the proposed transaction. The second computing node validates the proposed transaction. Upon validating the proposed transaction, the second computing node receives the transaction value from the first computing node, and adds a transaction record to a distributed ledger of the distributed transaction network to indicate receipt of the transaction value from the first computing node.

50 Claims, 13 Drawing Sheets

(56) References Cited

OTHER PUBLICATIONS

International Search Report and Written Opinion in International Appln. No. PCT/US2022/051171, mailed on Mar. 29, 2023, 9 pages.
Mbanaso et al., "Obligations of trust for privacy and confidentiality in distributed transactions," Internet Research, Apr. 2009, 19(2):153-173.
Van Steen et al., "A brief introduction to distributed systems," Computing, Aug. 2016, 98(10):967-1009.
International Preliminary Report on Patentability in International Appln. No. PCT/US2022/051171, mailed on Jun. 13, 2024, 8 pages.

\* cited by examiner

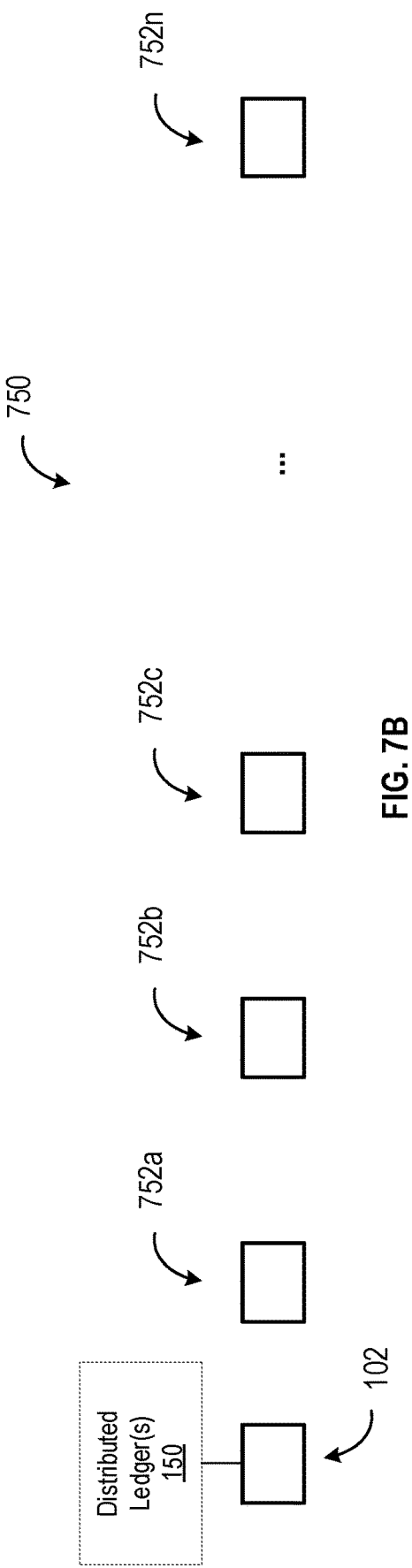

VALIDATING TRANSACTIONS ELECTRONICALLY USING PROOF OF RECEPTION VALIDATION PROTOCOL

CLAIM OF PRIORITY

This application claims priority to U.S. Provisional Application Ser. No. 63/283,789, filed on Nov. 29, 2021, and to U.S. Provisional Application Ser. No. 63/400,226, filed on Aug. 23, 2022, the entire contents of which are hereby incorporated by reference.

TECHNICAL FIELD

The disclosure relates to systems and methods for validating transactions electronically using a proof of reception validation protocol.

BACKGROUND

Entities can conduct transactions with one another to exchange items or other property. As an example, a first entity and a second entity can conduct a transaction whereby the first entity provides a first item to the second entity, in exchange for the second entity providing the first entity with a second item. In some implementations, entities can exchange physical items, digital items, monetary funds, or any other digital and/or physical property.

SUMMARY

In general, a distributed transaction network can validate transactions electronically using a proof of reception validation protocol.

In an example implementation, a distributed transaction network can include several computing nodes that are interconnected with one another via a communications network. Further, at least some of the computing nodes can store and maintain instances of a distributed ledger that stores information regarding previously conducted transactions and/or proposed new transactions between entities associated with the nodes.

Further, the distributed transaction network can facilitate the performance of electronic transactions according to a proof of reception validation protocol, whereby a potential recipient of value from the transaction validates one or more aspects of the transaction prior to receiving the value. Further, in some implementations, the recipient of value can record information regarding the successful completion of the transaction (e.g., in the distributed ledger or some other database), such that information can be retrieved by others. In some implementations, the distributed transaction network can be operated without relying on a proof of work consensus mechanism or a proof of stake consensus mechanism.

The implementations described in this disclosure can provide various technical benefits. For instance, a distributed transaction network can facilitate the performance of transactions in a secure, reliable, transparent, and efficient manner. As an example, the distributed transaction network can enable computing nodes to validate and record transactions in a distributed ledger, such that information regarding each transaction is stored in a transparent, traceable, and immutable manner. This enables the distributed transaction network to keep accurate and reliable records regarding each of the transactions conducted using the network.

Further, the distributed transaction network can operate without relying on a proof of work consensus mechanism. For instance, according to a proof of work consensus mechanism, entities "prove" to other entities that a certain amount of specific computation effort has been expended in order to perform certain operations or tasks using the computerized transaction system. However, proof of work consensus mechanisms often require the expenditure of significant amounts of computational and/or electrical resources that do not serve any other beneficial purpose outside of facilitating the proof of work consensus mechanism. By operating without a proof of work consensus mechanism, a distributed transaction network can eliminate or otherwise reduce this expenditure of computational and/or electrical resources, thereby enabling the distributed transaction network to operate more efficiently.

Further, the distributed transaction network can operate without relying on a proof of stake consensus mechanism. For instance, according to a proof of stake consensus mechanism, entities "prove" to other entities that they own a particular amount of a resource (e.g., a quantity of a digital currency) in order to perform certain operations or tasks using the computerized transaction system. However, proof of stake consensus mechanisms may concentrate control of a network to a select few that disproportionately own large portions of the resources in question. By operating without a proof of stake consensus mechanism, a distributed transaction network can operate in a more distributed and egalitarian manner, such that the distributed transaction network is more resistant to attacks or other attempts of control by a select few.

Further, in some implementations, without relying on a proof of work and/or proof of stake consensus mechanism (e.g., where third-party "miners" in proof of work and third-party "stakers" in proof of stake consensus mechanisms compete for transaction ("gas") fees in order to validate transactions, the proof of reception validation protocol enables self-validation of transactions without third-party interference). In some implementations, the benefits of such self-validation enables transactions to be performed without transaction fees and without any time delays caused by waiting for third party validation. Further, such self-validation can provide an absolute timestamp signature by one party (e.g., the receptor or recipient of the value), which prevents timestamp discrepancies that may be exhibited in proof of work and proof stake consensus mechanisms in which multiple validation miners and stakers provide different timestamps. Further, such self-validation can provide other efficiencies unique to the proof of reception validation protocol, as described in further detail herein.

Further, proof of work and/or proof of stake consensus mechanism may result in a consolidation of miners and/or stakers over time, which may reduce the number of entities that have control over a system. By operating without a proof of stake and/or proof of work consensus mechanisms, a distributed transaction network can operate in a more distributed and egalitarian manner.

Further, in some implementations, a centralized protocol validation for computer networks may rely on significant computing, financial, energy, security, and compliance resources, as a centralized authority may be tasked with validating all the transactions of all the users in the network based on third party data regulations and technical requirements. By operating without centralized protocol validation, protocol validation using proof of reception can save significant resources and can decentralize the validation of transactions among the users of the network (e.g., by enabling users to directly validate and conduct their own transactions).

Further still, in some implementations, recording a transfer of value on a distributed ledger can itself constitute the transfer of value from one party to another. For example, a record indicating the transfer of a digital asset (e.g., an amount of cryptocurrency, non-fungible token, etc.) from a first party to a second party can itself constitute the transfer of ownership of the digital asset from the first party to the second party. Further, a recipient of the digital asset can self-validate a transaction by confirming receipt of the digital asset, and recording the receipt of the digital asset in the digital ledger with a signature that is unique to the recipient (e.g., a unique signature). This can be beneficial, for example, in ensuring the finality of the transaction (e.g., such that the transaction value cannot be transferred to others or "double spent" prior to being transferred to the recipient) by the recipient's own self-validation of proof of reception instead of external validation by third-party "miners" in proof of work and third-party "stakers" in proof of stake.

Further still, in some implementations, use of the distributed transaction network can reduce reliance on centralized computer systems (e.g., cloud computing data centers) by allowing transactions to be processed using decentralized computer systems instead (e.g., decentralized client computer systems). Accordingly, the load on centralized data systems can be reduced.

In some implementations, some or all of the operations described herein can be performed automatically (e.g., without manual human input or intervention). This can be beneficial, for example, in enabling users to conduct transactions with one another in a quick and efficient manner and according to objective computer rules and operations. Nevertheless, in some implementations, at least some of the operations described herein can be performed manually by a user (e.g., either entirely by a user, or in conjunction with automated processes by a computer).

In an aspect, a method includes receiving, by a second computing node of a distributed transaction network, a data record from a first computing node of the distributed transaction network, where the data record includes: an indication of a proposed transaction, an indication of a transaction value associated with the proposed transaction, and an indication of a smart contract associated with the proposed transaction; validating, by the second computing node, the proposed transaction, where validating the proposed transaction includes at least one of: determining that the first computing node is in possession of the transaction value, or determining that the second computing node satisfies one or more requirements specified by the smart contract; upon validating the proposed transaction: (i) receiving, by the second computing node, the transaction value from the first computing node, and (ii) adding, by the second computing node, a transaction record to a distributed ledger of the distributed transaction network to indicate receipt of the transaction value from the first computing node, where the distributed ledger is maintained on two or more computing nodes of the distributed transaction network.

In another aspect, a method includes: receiving, by a second computing node of a distributed transaction network, a data record from a first computing node of the distributed transaction network, where the data record includes: an indication of a proposed transaction, an indication of a transaction value associated with the proposed transaction, and an indication of a smart contract associated with the proposed transaction; validating, by the second computing node, the proposed transaction, wherein validating the proposed transaction comprises at least one of: determining that the first computing node is in possession of the transaction value, or determining that the second computing node satisfies one or more requirements specified by the smart contract; upon validating the proposed transaction: receiving, by the second computing node, the transaction value from the first computing node.

Implementations of these aspects can include one or more of the following features, either individually or in any combination.

In some implementations, receiving the data record can include receiving the data record directly from the first computing node.

In some implementations, receiving the data record can include retrieving the data record from the distributed ledger.

In some implementations, receiving the data record can include retrieving the data record from a database different from the first computing node and the second computing node.

In some implementations, the method can also include: upon validating the proposed transaction, transmitting a second data record to the first computing node, where the second data record includes an indication of a second transaction value in accordance with the smart contract.

In some implementations, the method can also include: determining that the first computing node validated the second transaction value; and in response to determining that the first computing node validated the second transaction value, transmitting the second transaction value to the first computing node, where the transaction record further indicates transmission of the second transaction value to the first computing node.

In some implementations, the smart contract can include an indication of the transaction value, an indication of a second transaction value, and a program. The program, when executed, causes the first computing node to automatically provide the transaction value to the second computing node, and the second computing node to automatically provide the second transaction value to the first computing node.

In some implementations, the program, when executed, causes the first computing node to automatically provide the transaction value to the second computing node simultaneously with the second computing node automatically providing the second transaction value to the first computing node.

In some implementations, the distributed transaction network can include a plurality of computing nodes including the first computing node and the second computing node, and where at least one of the computing nodes includes: a computer device, a mobile device, or a wearable device.

In some implementations, the distributed ledger can be maintained by each of the computing nodes of the distributed transaction network.

In some implementations, the smart contract can include an indication of one or more criteria for receiving the transaction value.

In some implementations, the one or more criteria can pertain to a characteristic of a user associated with the second computing node.

In some implementations, receiving the transaction value can include at least one of: receiving funds from a financial account associated with the first computing node, or receiving one or more electronic tokens from the first computing node.

In some implementations, the transaction value can include an amount of cryptocurrency.

In some implementations, the transaction value can include physical property.

In some implementations, the transaction value can include a performance of a service.

In some implementations, the transaction value can include one or more non-fungible tokens.

In some implementations, the transaction value can include network resources associated with one or more satellites.

In some implementations, the transaction value can include network resources associated with one or more terrestrial networks.

In some implementations, the transaction value can include network resources associated with at least one of a Vehicle-to-Vehicle (V2V) or Mobile-to-Mobile (M2M) network.

In some implementations, the transaction value can include a performance of an industrial operation.

In some implementations, the transaction value can include media content.

In some implementations, the media content can include at least one of: video content, audio content, text content, video game content, virtual reality content, or augmented reality content.

In some implementations, the transaction value can include a government service.

In some implementations, the transaction value can include a delivery of goods in a supply chain.

In some implementations, the transaction value can include medical information regarding a patient.

In some implementations, the distributed ledger can include a blockchain.

In some implementations, the proposed transaction can be validated based on data received from a first computer system different from the distributed transaction network.

In some implementations, the data can be received from the first computer system via a second computer system providing an application programming interface (API).

In some implementations, the method can also include preventing, by the second computing node, the first computing node from transferring the transaction value to one or more other computing nodes prior to the receipt of the transaction value by the second computing node.

In some implementations, preventing the first computing node from transferring the transaction value to one or more other computing nodes prior to the receipt of the transaction value by the second computing node can include causing the transaction value to be transmitted to an entity that is independent from the first computing node and the second computing node.

In some implementations, the method can also include preventing, by the second computing node, the first computing node from initiating transactions with one or more other computing nodes prior to the receipt of the transaction value by the second computing node.

In some implementations, the method can also include preventing, by the second computing node, the first computing node from conducting transactions with one or more other computing nodes prior to validation of the proposed transaction by the second computing node.

In some implementations, the method can also include adding, by the second computing node, a transaction record to a distributed ledger of the distributed transaction network to indicate receipt of the transaction value from the first computing node, wherein the distributed ledger is maintained on two or more computing nodes of the distributed transaction network.

In some implementations, the method can also include adding, by the second computing node, a transaction record to a data store of the second computing node to indicate receipt of the transaction value from the first computing node, wherein the data store is maintained locally on the second computing node.

In some implementations, the method can also include transmitting the transaction record to one or more additional nodes of the distributed transaction network.

In some implementations, the method can also include adding, by the first computing node, a transaction record to a data store of the first computing node to indicate receipt of the transaction value by the second computing node from the first computing node, wherein the data store is maintained locally on the first computing node.

In some implementations, the method can also include adding, by the second computing node, a transaction record to a database to indicate receipt of the transaction value from the first computing node, where the database is different from the first computing node and the second computing node.

In some implementations, the transaction record can include a signature unique to the second computing node.

In some implementations, the signature can include a cryptographic key and/or or biometric information.

Other implementations are directed to systems, devices, and other objects for performing some or all of the methods described herein. Other implementations are directed to one or more non-transitory computer-readable media including one or more sequences of instructions which when executed by one or more processors causes the performance of some or all of the methods described herein.

The details of one or more embodiments are set forth in the accompanying drawings and the description. Other features and advantages will be apparent from the description and drawings, and from the claims.

BRIEF DESCRIPTION OF DRAWINGS

FIG. 7B is a diagram of an example industrial system.

DETAILED DESCRIPTION

Figure 1:
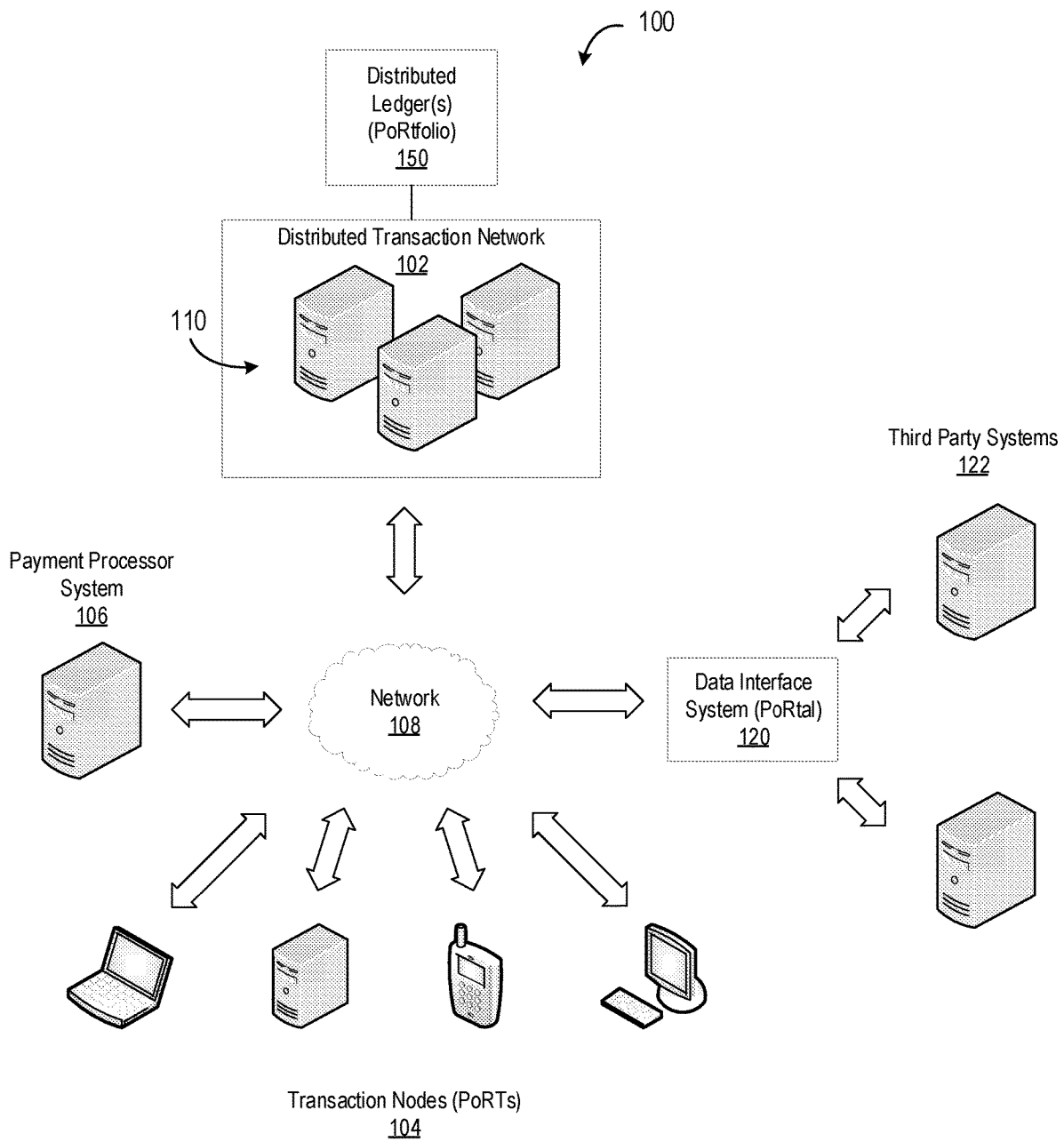
FIG. 1 is a diagram of an example system including a distributed transaction network.

In general, a distributed transaction network can validate and record transactions electronically using a distributed ledger and a proof of reception (POR) validation protocol.

In an example implementation, a distributed transaction network can include several computing nodes that are interconnected with one another via a communications network, such as the Internet. Further, at least some of the computing nodes can store and maintain instances of a distributed ledger that stores information regarding previously conducted transactions and/or proposed new transactions between entities associated with the nodes. As an example, each instance of the distributed ledger can store information regarding each of the previously conducted transactions, such as the entities associated with each transaction, the items or other property exchanged during each transaction, the terms or conditions associated with each transaction (e.g., expressed as a "smart contract"), and an indication that the transaction was successfully validated and completed. As an example, each instance of the distributed ledger can store information regarding a proposed new transaction, such as the entity associated with the proposed transaction, the items or other property available for exchange via the proposed transaction, and the terms or conditions associated with the proposed transaction (e.g., expressed as a "smart contract").

Further, the distributed transaction network can facilitate the performance of electronic transactions according to a proof of reception validation protocol, whereby a potential recipient of value from the transaction validates one or more aspects of the transaction prior to receiving the value. Further, the recipient of value can record information regarding the successful completion of the transaction in the distributed ledger, such that information can be retrieved by others. In some implementations, a unit or instance of value may be referred to as a "PoRt ion" or "PoRtion." In some implementations, if a first unit or instance of value is provided in exchange for a second unit or instance of value, one of the units or instances of value may be referred to as "PoRt (−) ion," and the other unit or instance of value may be referred to as "PoRt (+) ion."

For instance, in an example transaction, a first entity associated with a first computing node may wish to provide a second entity associated with a second computing node with a particular item or other property (e.g., monetary funds having a particular value, physical property, digital property, or any other property). To receive the item or property, the second computing node validates one or more aspects of the transaction, such as (i) verifying that the first entity is in possession or otherwise controls the disposition of the item or property and/or (ii) confirming the provenance of the item or property. Upon validating the transaction, the second computing node receives the specified item or property, and records the transaction on a distributed ledger.

In another example transaction, a first entity associated with a first computing node may wish to provide a first item or other property to a second entity associated with a second computing node, in exchange for a second item or other property from the second entity. To complete the transaction, the first computing node and the second computing node each validates one or more aspects of the transaction. For example, the second computing node can (i) verify that the first entity is in possession or otherwise controls the disposition of the first item or property and/or (ii) confirm the provenance of the first item or property. Further, the first computing node can (i) verify that the second entity is in possession or otherwise controls the disposition of the second item or property and/or (ii) confirm the provenance of the second item or property. Upon validating the transaction, the second computing node receives the specified first item or property, and the first computing node receives the specified second item or property. Further, each of the first computing node and the second computing node record the transaction on a distributed ledger.

In some implementations, the distributed transaction network can facilitate the performance of electronic transactions according to a proof of reception validation protocol, whereby a recipient of value from the transaction validates the completion of the transaction upon receiving that value. Further, the recipient of value can record information regarding the successful completion of the transaction in the distributed ledger, such that information can be retrieved by others.

For instance, in an example transaction, a first entity associated with a first computing node may wish to provide a second entity associated with a second computing node with a particular item or other property (e.g., monetary funds having a particular value, physical property, digital property, or any other property). Upon the second entity receiving the item or property from the first entity, the second computing node validates the transaction and records the transaction on a distributed ledger.

The distributed transaction networks described in this disclosure can provide various technical benefits. For instance, a distributed transaction network can facilitate the performance of transactions in a secure, reliable, transparent, and efficient manner. As an example, the distributed transaction network can enable computing nodes to validate and record transactions in a distributed ledger, such that information regarding each transaction is stored in a transparent, traceable, and immutable manner. This enables the distributed transaction network to keep accurate and reliable records regarding each of the transactions conducted using the network.

Further, in some implementations, the distributed transaction network can be operated without relying on a proof of work consensus mechanism or a proof of stake consensus mechanism. This can also provide specific technical benefits.

For example, according to a proof of work consensus mechanism, entities "prove" to other entities that a certain amount of specific computation effort has been expended in order to perform certain operations or tasks using the computerized transaction system. However, proof of work consensus mechanisms often require the expenditure of significant amounts of computational and/or electrical resources that do not serve any other beneficial purpose outside of facilitating the proof of work consensus mechanism. By operating without a proof of work consensus mechanism, a distributed transaction network can eliminate or otherwise reduce this expenditure of computational and/or electrical resources, thereby enabling the distributed transaction network to operate more efficiently.

As another example, according to a proof of stake consensus mechanism, entities "prove" to other entities that they own a particular amount of a resource (e.g., a quantity of a currency) in order to perform certain operations or tasks using the computerized transaction system. However, proof of stake consensus mechanisms may concentrate control of a network to a select few that disproportionally own large portions of the resources in question. By operating without a proof of stake consensus mechanism, a distributed transaction network can operate in a more distributed and egalitarian manner, such that the distributed transaction network is more resistant to attacks or other attempts of control by a select few.

Further, proof of work and/or proof of stake consensus mechanism may result in a consolidation of miners and/or stakers over time, which may reduce the number of entities that have control over a system. By operating without a proof of stake and/or proof of work consensus mechanisms, a distributed transaction network can operate in a more distributed and egalitarian manner.

FIG. 1 shows an example system 100 of interconnected electronic devices. The system 100 includes a distributed transaction network 102 implementing a distributed ledger 150, several transaction nodes 104 (also referred to as "PoRts," proof of reception terminals, or self-validating wallet nodes), and a payment processor system 106. The system 100 also includes a data interface system 120 (also referred to as a "PoRtal" or POR terminal access link) communicatively coupled to one or more third-party systems 122. Further, the system 100 includes a network 108 communicatively coupling the distributed transaction network 102, the transaction nodes 104, the payment processor system 106, the data interface system 120, and the third party systems 122 to one another.

In general, the distributed transaction network 102 includes two or more interconnected computing devices 110. Further, the computing devices 110 of the distributed transaction network 102 collectively maintain a distributed ledger 150 that stores information regarding previously conducted transactions and/or proposed new transactions (e.g., by entities associated with one or more of the transaction nodes 104). In some implementations, the distributed ledger 150 may be referred to as a "Portfolio" (e.g., PoR transaction folder input-output).

As an example, the distributed ledger 150 can store information regarding each of several previously conducted transactions. Example information includes the entities associated with each transaction, the items or other property exchanged during each transaction, the terms or conditions associated with each transaction (e.g., expressed as a "smart contract" or "PoRtraits"), and an indication that the transaction was successfully validated and completed. Other example information regarding previously conducted transactions are described in further detail below.

As another example, the distributed ledger 150 can store information regarding each of several proposed new transactions. Example information includes the entity or entities associated with the proposed transaction, the items or other property available for exchange via the proposed transaction, and the terms or conditions associated with the proposed transaction (e.g., expressed as a "smart contract"). Other example information regarding proposed new transactions are described in further detail below.

In some implementations, a smart contract can be implemented on a distributed ledger 150 implemented by the distributed transaction network 102, the transaction nodes 104, or a combination thereof. As an example, a smart contract can be implemented on an instance of a distributed ledger 150 that is local to one of the transaction nodes 104. As an example, a smart contract can be implemented on an instance of a distributed ledger 150 that is distributed across one or more of the transaction nodes 104 and/or the distributed transaction network.

In some implementations, at least some of the information stored by the distributed transaction network 102 can be provided to the distributed transaction network 102 by one or more of the transaction nodes 104. For example, the transaction nodes 104 can perform a variety of operations to identify proposed transactions, validate the proposed transactions, and conduct the proposed transactions. Further, during and/or subsequent to performing these operations, the transaction nodes 104 can provide information regarding the operations to the distributed transaction network 102 for storage.

In some implementations, the distributed ledger 150 can store information in several blocks (e.g., several data records or other logical units of data). For example, each block of the distributed ledger 150 can include information regarding a particular transaction or a particular group of transactions.

Further, the blocks can be sequentially arranged in a chain (e.g., a "blockchain"). For example, the blocks can be arranged in a chain in order of time, where the first block in the chain corresponds to the first transaction (or group of transactions) in time, and the last block in the chain corresponds to the most recent transaction (or group of transactions) in time.

Further, the blocks can be cryptographically signed, such that the blocks cannot be tampered with after they have been added to the distributed ledger 150. For instance, each block in a chain can be cryptographically signed based on one or more previous blocks in the chain. As an example, a first block can be cryptographically signed by inputting at least the following into a hashing function: (i) a hash value representing the first block, and (ii) a hash value representing the immediately prior block in the chain. The output of the hashing function can be used as the cryptographic signature for the first block in the chain. If the prior block in the chain is subsequently modified, the modification would result in a different hash value for that block. Accordingly, the cryptographic signature of the first block (and the cryptographic signature of all blocks subsequent to the first block in the chain) would no longer be valid. Thus, if a block is tampered with after it has been added to the chain, the tampering can be readily detected and invalidated based on the inconsistencies of the cryptographic signatures of the blocks in the chain.

In some implementations, each of the computing devices 110 of the distributed transaction network 102 can maintain a respective instance of the distributed ledger 150 (e.g., a copy of the distributed ledger 150). Further, each of the computing devices 110 of the distributed transaction network 102 can periodically or continuously modify the distributed ledger 150 over time. For example, each of the computing devices 110 of the distributed transaction network 102 can add additional cryptographically signed blocks to the chain, such as to record new transactions conducted by the transaction nodes 104).

In some implementations, a subset of the computing devices of the distributed transaction network 102 can maintain a respective instance of the distributed ledger 150. Further, a subset of the computing devices of the distributed transaction network 102 can periodically or continuously modify the distributed ledger 150 over time (e.g., by adding additional cryptographically signed blocks to the chain).

In some implementations, the transaction nodes 104 can perform transactions by exchanging items or other property with one another directly. For example, for a transaction including the transfer of monetary funds from first entity associated with a first transaction node to a second entity associated with a second transaction node, the first transaction node can directly transfer the monetary funds from a first account associated with the first entity to a second account associated with the second entity. As another example, for a transaction including the transfer of other digital property (e.g., electronic tokens, such as non-fungible tokens) from first entity associated with a first transaction node to a second entity associated with a second transaction node, the first transaction node can directly transfer the digital property from a first account associated with the first entity to a second account associated with the second entity. As another example, for a transaction including the transfer of physical items from the first entity associated with a first transaction node to a second entity associated with a second transaction node, the first entity can directly transfer the physical property to the second entity. As another example, for a transaction including the performance of a service by the first entity associated with a first transaction node for a second entity associated with a second transaction node, the first entity can directly perform the service for the second entity.

In some implementations, the transaction nodes 104 can perform transactions by exchanging items or other property with one another using an intermediary. For example, for a transaction including the transfer of monetary funds from first entity associated with a first transaction node to a second entity associated with a second transaction node, the first transaction node can instruct a payment processor system 106 to transfer the monetary funds from a first account associated with the first entity to a second account associated with the second entity. As another example, for a transaction including the transfer of other digital property (e.g., electronic tokens, such as non-fungible tokens) from first entity associated with a first transaction node to a second entity associated with a second transaction node, the first transaction node can instruct the payment processor system 106 to transfer the digital property from a first account associated with the first entity to a second account associated with the second entity. In some implementations, the payment processor system 106 can be maintained and operated by a financial institution (e.g., a bank, credit card issuer, or credit union), a clearing house, a cryptocurrency exchange, or any other organization (or organizations) that facilitate the transfer of funds between entities.

In some implementations, the records on the distributed ledger itself can be an exchange of value (e.g., an exchange of cryptocurrency, electronic tokens such as non-fungible tokens, etc.). For example, the distributed ledger can indicate the cryptocurrency balances of several users (e.g., users of the transaction nodes 104, distributed transaction network 102, etc.), and individual records on the distributed ledger can indicate changes to the cryptocurrency balances of one or more users over time (e.g., exchanges of cryptocurrency between users). As another example, the distributed ledger can indicate the non-fungible token holdings of several users (e.g., users of the transaction nodes 104, distributed transaction network 102, etc.), and individual records on the distributed ledger can indicate changes to the holdings of one or more users over time (e.g., exchanges of non-fungible tokens between users).

In some implementations, the records on the distributed ledger can also represent an exchange of value that does not directly utilize the system 100. For instance, the distributed ledger can function as an authoritative and immutable record of any exchange of value between users, including the exchange of value using the system 100 itself (e.g., "online" transactions) and/or the exchange of value using mechanisms other than the system 100 (e.g., "offline" transactions). Example "offline" transactions include an exchange of fiat currency, an exchange of physical property, an exchange of value using a third-party system, the performance of a service, the providing of an experience (e.g., the performance of an event for others), or any other exchange of value that is not provided using the system 100 directly. Other example "offline" transactions include the exchange of music, videos, and/or art (e.g., either digitally or through in-person performances). Other example "offline" transactions include the providing of food or beverages (e.g., in a restaurant, bar, etc.); the providing of humanitarian aid; and the exchange of merchandise (e.g., either digital merchandise or physical merchandise).

In some implementations, at least some transactions can pertain to a "crowdsourcing" of funding (e.g., in which multiple contributors provide value to one or more entities, such as to collectively raise money for a project or venture).

In some implementations, at least some transactions can pertain to the exchange of value with respect to capital markets. For example, at least some transactions can pertain to the transfer of currency (e.g., fiat currency and/or cryptocurrency), natural resources, commodities, energy (e.g., renewable energy), power purchase agreements (PPAs), carbon credits, capital expenditures, real estate, structural financial products, etc. As further examples, at least some transactions can pertain to the transfer of value with respect to special purpose acquisition companies (SPACs). As further examples, at least some transactions can pertain to the transfer to value with respect to insurance products, financial products, stocks, bonds, loans, options, etc.

In some implementations, at least some transactions can pertain to the exchange of value with respect to one or more supply chains. For example, at least some transactions can pertain to the transfer of payments for services rendered and/or goods delivered. As another example, at least some transactions can pertain to the performance of a service (e.g., conveying and/or delivering goods). As another example, at least some transactions can pertain to providing a loan. As another example, at least some transactions can pertain to making an investment in a venture. As another example, at least some transactions can pertain to providing insurance.

In some implementations, at least some transactions can pertain to the exchange of value with respect to providing humanitarian aid. For example, at least some transactions can pertain to providing money, food, water, energy, shelter, and/or clothing. As another example, at least some transactions can pertain to providing donations of value to others.

In some implementations, at least some transactions can pertain to the exchange of value in the context of travel. For example, at least some transactions can pertain to providing flights, hotel accommodations, vehicle rentals, tickets (e.g., tickets or travel and/or events), and/or other travel products to others.

In some implementations, the records of the distributed ledger 150 can cryptographically "wrap" digital assets that are not native to the distributed ledger 150, such that the digital asset can be transferred using the distributed ledger 150. For example, the distributed ledger 150 can record the generation and transfer of a first set of cryptographic tokens indicating ownership or control or another digital asset (e.g., a second set of cryptographic tokens that are not native to the distributed ledger 150). Users can exchange the first set of cryptographic tokens to exchange ownership or control of the underlying digital assets.

In some implementations, the distributed transaction network 102 can retrieve information from one or more third party systems 122 via a data interface system 120 (also referred to as a "PoRtal," POR terminal access link, or "oracle"), and record at least some of the retrieved information in the distributed ledger 150. In general, this information can be any information relating to value held by one or more users and/or the transfer to value between two or more users.

As an example, a third party system 122 can maintain records indicating the value held by users, and provide at least a portion of the records to the distributed transaction network 102 via the data interface system 120. Further, the distributed transaction network 102 can store at least some of the records in the distributed ledger 150 (e.g., such that users can determine the value held by other users in an accurate and transparent manner using the distributed ledger 150).

As another example, a third party system 122 can maintain record of transfers of value held by users, and provide at least a portion of the records to the distributed transaction network 102 via the data interface system 120. Further, the distributed transaction network 102 can store at least some of the records in the distributed ledger 150 (e.g., such that users can obtain information regarding previously performed transactions in an accurate and transparent manner using the distributed ledger 150).

In some implementations, the third party system 122 can maintain records indicating "offline" value held by users (e.g., value held by users outside of the system 100) and/or "offline" transactions performed by users (e.g., transactions performed by users using mechanisms other than the system 100). These records can be provided to the distributed transaction network 102 for recording by the data interface system 120. Accordingly, the distributed ledger 150 can provide an authoritative and immutable record of any "offline" value or the "offline" exchange of such value between users.

In some implementations, the distributed transaction network 102 can transmit information to one or more of the third party systems 122 via the data interface system 120. In general, this information can be any information relating to value held by one or more users and/or the transfer to value between two or more users.

As an example, the distributed transaction network 102 can determine that users are performing a transaction using the system 100 (e.g., using a proof of reception validation protocol), but that the exchange of value itself is to be performed using a third party system (e.g., an "offline" transaction). In response, the distributed transaction network 102 can transmit a command to the third party system 122 to perform the exchange of value.

As an example, the distributed transaction network 102 can determine that users are performing a transaction using the system 100 (e.g., using a proof of reception validation protocol), but that the exchange of value itself is to be performed directly between the users. In response, the distributed transaction network 102 can transmit a record of the transaction to the third party system 122 for storage and future retrieval.

In some implementations, the data interface system 120 can include one or more computer systems implementing an application programming interface (API). The API is a software intermediary that enables third parties to interface with the distributed transaction network 102 using a set of pre-defined commands, functions, programs, or subroutines, etc. In some implementations, the API can be provided by the same entity (or entities) that develop or maintain at least a portion of the distributed transaction network 102.

Although FIG. 1 shows an example data interface system 120 communicatively coupling third party system 122 to the rest of the system 100, in practice, a data interface system 120 can also communicatively couple any of the components of the system 100 to one another. For example, a data interface system 120 can communicatively couple the transaction nodes 104 and/or the payment processor system 106 to the other components of the system 100. Further, in some implementations, one or more of the computer devices 110 can also operate as a data interface system 120 (e.g., by communicatively coupling one or more of the components of the system 100 to one another).

In practice, each of the transaction nodes 104 can be associated with one or more entities (e.g., entities that wish to perform transactions using the system 100). Example entities include individuals, families, companies or corporations, governments, and organizations.

Similarly, each of the third party system 122 can be associated with one or more entities (e.g., entities that store records of "offline" value or transactions of such value). Example entities include individuals, families, companies or corporations, governments, and organizations. In some implementations, one or more of the third party systems 122 can be maintained and operated by a financial institution (e.g., a bank, credit card issuer, or credit union). In some implementations, one or more of the third party systems 122 can be maintained and operated by an entity that provides services or experiences to users directly. Examples of such entities include event coordinators, performers, providers of humanitarian aid, charities, digital content providers (e.g., streaming audio and/or video providers), restaurants, artisans, tour guides, or any other entity that provides a series of experiences to users directly.

In general, the distributed transaction network 102 can include any number of computer devices 110 that are configured to receive, process, and transmit data. Similarly, each of the transaction nodes 104 can include any number of computer devices that are configured to receive, process, and transmit data. Similarly, the payment processor system 106 also can include any number of computer devices that are configured to receive, process, and transmit data.

Example computer devices include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer devices can operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, one or more of the computer devices need not be located locally with respect to the rest of the system 100, and one or more of the computer devices can be located in one or more remote physical locations.

Each of the computer devices can include a respective user interface that enables users to interact with that computer device and/or other computer devices. For example, a user interface can enable a user to view data from one or more of the computer devices. As another example, a user interface can enable a user to transmit data from one computer device to another. As another example, a user interface can enable a user to issue commands to one or more of the computer devices. Commands can include, for example, any user instruction to one or more of the computer devices to perform particular operations or tasks. In some implementations, a user can install a software application (also referred to as "PoRtable") onto one or more of the computer devices to facilitate performance of these tasks.

Similarly, the payment process, the data interface system 120, and/or the third party system 122 also can be implemented using any number of computer devices (e.g., client computing devices, server computing, mobile computing devices, wearable computing devices, etc.).

In FIG. 1, the payment processor system 106 and each of the transaction nodes 104 are illustrated as respective single components. However, in practice, the payment processor system 106 and/or the transaction nodes 104 can be implemented on one or more respective computing devices (e.g., each computing device including at least one processor such as a microprocessor or microcontroller).

Further, although FIG. 1 shows the transaction nodes 104 and the payment processor system 106 as separate from the distributed transaction network 102, in practice, the distributed transaction network 102 can include at least some of the transaction nodes 104 and/or the payment processor system 106.

The network 108 can be any communications network through which data can be transferred and shared. For example, the network 108 can be a local area network (LAN) or a wide-area network (WAN), such as the Internet. The network 108 can be implemented using various networking interfaces, for instance wireless networking interfaces (such as Wi-Fi, Bluetooth, or infrared) or wired networking interfaces (such as Ethernet or serial connection). The network 108 also can include combinations of more than one network, and can be implemented using one or more networking interfaces.

Figure 2:
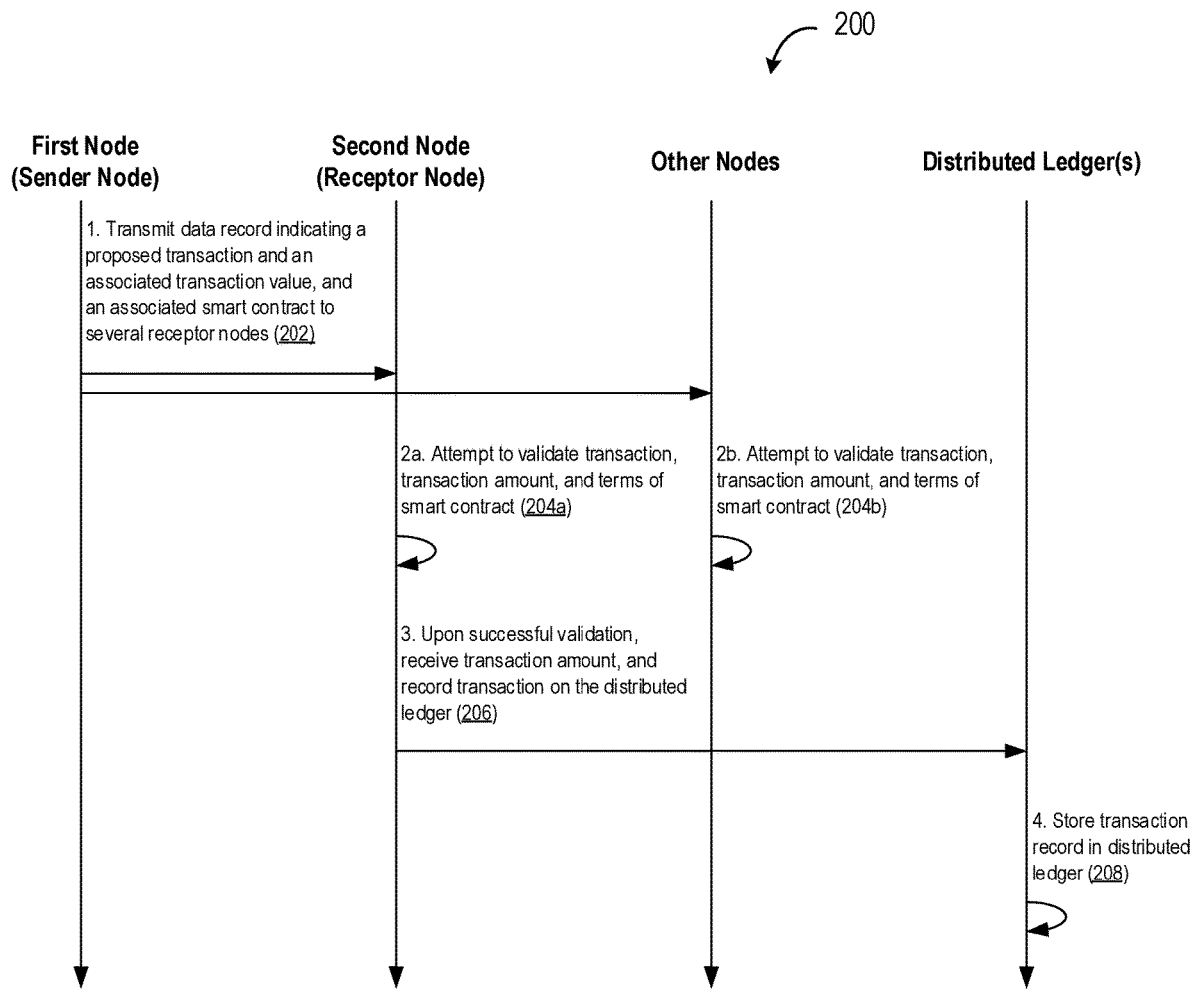
FIG. 2 is a flow chart diagram of an example process for operating a distributed transaction network, such as to facilitate the performance of a unilateral transaction.

In some implementations, the system 100 can facilitate the performance of a unilateral transaction, in which an item or other property is provided by a first entity associated with a first computing node to a second entity associated with a second computing node, without requiring that the second entity provide an item or other property to the first entity in exchange. An example process 200 for facilitating unilateral transactions is shown in FIG. 2.

According to the process 200, a first computing node transmits a data record regarding a proposed transaction to several other computing nodes (block 202). As an example each of the computing nodes can be a respective one of the transaction nodes 104 shown in FIG. 1.

The data record can include various information regarding the proposed transaction. As an example, the data record can indicate a transaction value associated with the proposed transaction. In some implementations the transaction value can be a monetary amount (e.g., monetary funds having a particular value) that will be transmitted from the first entity to another entity as a part of the transaction (e.g., in the form of a cryptocurrency and/or fiat currency). As another example, the transaction value can represent some other property that will be transmitted from the first entity to another entity as a part of the transaction, such as a physical item, a digital item, or any other property. As another example, the transaction value can include one or more electronic tokens (e.g., fungible tokens and/or non-fungible tokens). As another example, the transaction value can represent the performance of a service (e.g., a particular task or operation) by the first entity for another entity as a part of the transaction).

As another example, the data record can indicate a smart contract associated with the proposed transaction. In general, a smart contract is a computer program or a transaction protocol that is configured to automatically execute, control, and/or record legally relevant events and actions according to the terms of a contract or an agreement (e.g., as a part of the transaction).

In some implementations, the smart contract can specify one or more conditions that must be met before the transaction is to proceed. As an example, the smart contract may require that a recipient of the specified value meet certain eligibility requirements (e.g., age, gender, demographic, or any other characteristic). As an example, the smart contract may require that the transaction be conducted within a certain specified time interval.

In some implementations, the smart contract may specify that a recipient of the specified value provide a corresponding reciprocal value to the sender. Further, in some implementations, the smart contract may specify that the sender and recipient validate one another as a part of completing the transaction (e.g., using a proof of reception validation protocol).

In some implementations, the smart contract can include one or more data fields, each including particular information regarding the transaction. As an example, the smart contract can include one or more of the following data fields:

1. Sender Node (SN) Proof of Reception Terminal (PoRt) Address: the address of a wallet associated with the sender node (e.g., a private key and public key pair for sending and/or receiving cryptocurrency and/or other data by the sender node).
2. Receptor Node (RN) PoRt Address: the address of a wallet associated with the receptor node (e.g., a private key and public key pair for sending and/or receiving cryptocurrency and/or other data by the receptor node).
3. SN Specified Value (SV) Exchanged: a specified value or property to be transmitted from the sender node to the receptor node as a part of the transaction.
4. RN SV Exchanged: a specified value or property to be transmitted from the receptor node to the sender node as a part of the transaction (e.g., in the case of a bilateral transaction, discussed in further detail with reference to FIG. 3).
5. Database Source(s) (DS) for Validation: the identity and/or locations of one or more databases of information that can be used to validate the terms of the smart contract.
6. SV Categories: categories for the specified value. Example categories include financial (e.g., monetary funds), physical property (e.g., physical items), digital property (e.g., digital content, such as songs or videos, digital storage of data, etc.), and services (e.g., services can be rendered by the sender node and/or the receptor node).
7. SV Mode: a type of ownership conveyed by the transaction for the specified value. Example types of ownership include total ownership (e.g., a total transfer of ownership by the sender node to the receptor node), partial ownership (e.g., a transfer of partial ownership by the sender node to the receptor node), a limit access license (e.g., a license by the sender node to the receptor node to access the specified value for a limited period, such as a specified amount of time and/or a specified number of accesses or plays), an unlimited access license (e.g., a license by the sender node to the receptor node to access the specified value for an unlimited period, such as an unlimited amount of time and/or an unlimited number of accesses or plays), or any other total or partial transfer of ownership.
8. Specified Value Sequence (SVS): the terms by which the specified value can be transferred to one or more additional entities. For example, the SVS can specify that, if the specified value is subsequently transferred by the receptor node to another entity, a particular portion of the specified value (e.g., a royalty) be transmitted to the original sender node.
9. Eligibility Requirements: conditions that must be met by the sender node and/or the receptor node in order for the transaction to proceed. As an example, eligibility requirements can be based on the characteristics of an entity (or entities) associated with the sender node and/or the receptor node, such as the age, gender, demographic, or any other characteristic regarding the entity or entities.
10. Time Limit: a time limit for validating the transaction and/or completing the transaction. If a transaction is not validated and/or completed within the time limit, the transaction expires.
11. Timestamp(s): timestamps indicating a start, duration, and/or finish of a transaction. In some implementations, a timestamp may be referred to as "PoRage."
12. Identity: the identity of entities associated with the sender node and/or the receptor node. In some implementations, the identity of entities can be accessible by others (e.g., to satisfy anti-money laundering (AML) and/or Know Your Client (KYC) regulations in particular jurisdictions). In some implementations, the identity of entities can be encrypted or hashed (e.g., to maintain a degree of privacy).
13. Rating, Reception Score, and/or Trust Algorithm: a metric representing a quality of a particular computing node. As an example, a rating can indicate the quality of validation performed by a particular computing node, such as the accuracy of the validation, the speed of the validation, and/or the frequency in which the computing node performs validations. In some implementations, a computing node can determine whether to transact with another computing node based, at least in part, on the rating of the other node.
14. Validation: additional conditions, requirements, or other aspects of the transaction that must be validated by the receptor node to complete the transaction. As an example, a receptor node may be required to submit proof of receipt of the specified value, and/or publicly acknowledge receipt of the specified value (e.g., in a distributed ledger, a website, or other form of publication). In some implementations, proof of receipt can include video, image, text, audio, link signature, "VITALS" (e.g., as discussed below), and/or any combination thereof.

Although example smart contract fields are described above, these are merely illustrative examples. In practice, other smart contract fields also can be used, either in addition to or instead of those described above.

In the example shown in FIG. 2, the first node transmits the data record to several other computing nodes, each of which may be eligible to receive the specified transaction value indicated in the data record. The node that validates the transaction the earliest in time can receive the specified transaction value. Further in some implementations, this node can additionally lock the specified transaction value, such that the first node cannot transfer the transaction value to other nodes prior to the completion of the validation process (e.g., as described in further detail below).

For instance, as shown in FIG. 2, upon receiving the data record from the first computing node, a second computing node and several other computing nodes each attempts to validate the transaction (blocks 204a and 204b). Each of the second computing node and the other computing nodes can perform various operations to validate the transaction, depending on the nature of the transaction.

For instance, if the transaction includes the transfer of a specified value from the sender node to a receptor node, each of the second computing node and other computing nodes can attempt to verify that the sender node is in possession of the specified value or otherwise controls the disposition of the specified value. In some implementations, this verification can be performed based on information from one or more databases (e.g., databases specified by one or more data fields of the smart contract). As another example, each of the second computing node and other computing nodes can attempt to confirm the provenance of the specified value.

As another example, if the data record includes a smart contract associated with the transaction, each of these computing nodes can attempt to validate the terms of the smart contract. For example, each of these computing nodes can attempt to prove that an entity associated with that computing node meets the eligibility requirements to receive the specified value. As another example, each of these computing nodes can attempt to prove that the computing node meets a particular rating requirement specified by the smart contract. As another example, each of these computing nodes can attempt to prove that the transaction will be conducted within the time interval specified by the smart contract. In some implementations, these verifications can be performed based on information from one or more databases (e.g., databases specified by one or more data fields of the smart contract).

In this example, the second computing node is the first to successfully validate the transaction. Upon successfully validating the transaction, the second computing node receives the specified transaction value, and records the completion of the transaction to the distributed ledger (block 206). In some implementations, the second computing node can receive the specified transaction value directly from the first computing node. In some implementations, the second computing node can receive the specified transaction value indirectly from the first computing node via an intermediary (e.g., the payment processor system 106 or some other system).

Further, a record of the transaction is stored in the distributed ledger (block 208). For example, the second computing node can transmit a data block to the distributed transaction network 102, and the distributed transaction network 102 can store the block as an additional block in a chain of blocks of the distributed ledger.

As described above, in some implementations, each block can be cryptographically signed in the chain, such that the blocks cannot be tampered with after they have been added to the distributed ledger. For instance, each block in the chain can be cryptographically signed based on one or more previous blocks in the chain. Accordingly, the cryptographic signature of the first block (and the cryptographic signature of all blocks subsequent to the first block in the chain) would no longer be valid. Thus, if a block is tampered with after it has been added to the chain, the tampering can be readily detected and invalidated based on the inconsistencies of the cryptographic signatures of the blocks in the chain.

Figure 3:
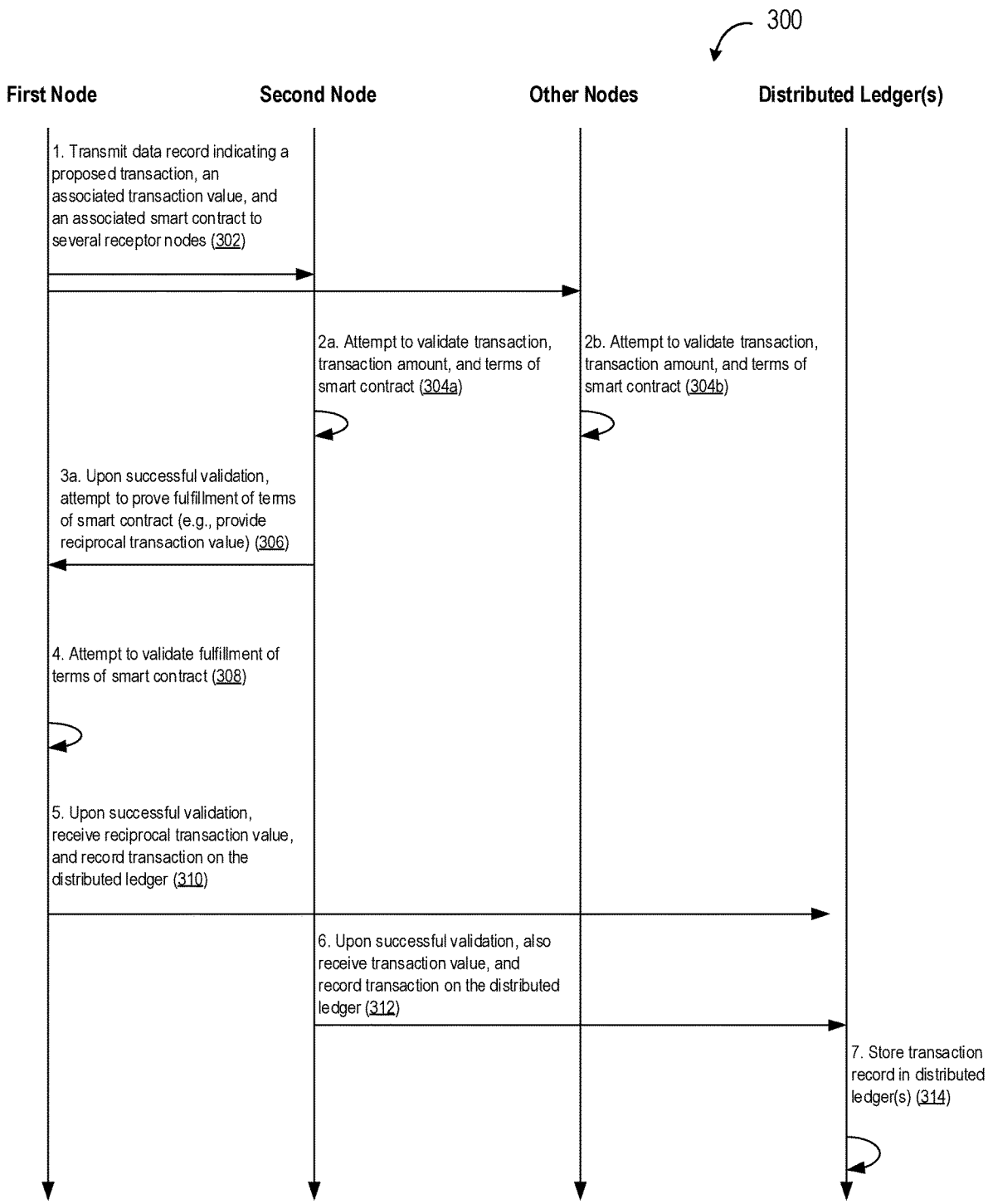
FIG. 3 is a flow chart diagram of another example process for operating a distributed transaction network, such as to facilitate the performance of a bilateral transaction.

In some implementations, the system 100 can facilitate the performance of a bilateral transaction, in which a first item or other property is provided by a first entity associated with a first computing node to a second entity associated with a second computing node, in exchange for a second item or other property provided by the second entity associated to the first entity. An example process 300 for facilitating bilateral transactions is shown in FIG. 3. In some implementations, the process 300 can facilitate the performance of bilateral transactions in an atomic manner (e.g., in which either all of the exchanges occur, or none at all).

According to the process 300, a first computing node transmits a first data record regarding a first proposed transaction to several other computing nodes (block 302). As an example each of the computing nodes can be a respective one of the transaction nodes 104 shown in FIG. 1.

In general, the first data record can be similar to that described with reference to FIG. 2. For example, the first data record can include various information regarding the first proposed transaction, such as a transaction value associated with the first proposed transaction, and a smart contract associated with the first proposed transaction.

However, in this example, the smart contract indicates that, in order for a receptor node to receive the specified transaction value, the receptor node must provide some other specified transaction value (e.g., reciprocal transaction value) to the sender node in exchange. As an example, this requirement can be indicated using the "RN SV Exchanged" data field of the smart contract, as described above.

In the example shown in FIG. 3, the first node transmits the first data record to several other computing nodes, each of which may be eligible to receive the specified transaction value indicated in the first data record. The first node to validate the first transaction can receive the specified transaction value.

For instance, as shown in FIG. 3, upon receiving the first data record from the first computing node, a second computing node and several other computing nodes each attempts to validate the first transaction (blocks 304a and 304b). Each of the second computing node and the other computing nodes can perform various operations to validate the first transaction, depending on the nature of the transaction.

For example, as described with reference to FIG. 2, if the first transaction includes the transfer of a specified value from the sender node to a receptor node, each of the second computing node and other computing nodes can attempt to (i) verify that the sender node is in possession of the specified value or otherwise controls the disposition of the specified value and/or (ii) confirm the provenance of the specified value. As another example, as described with reference to FIG. 2, if the first data record includes a smart contract associated with the first transaction, each of these computing nodes can attempt to validate the terms of the smart contract.

In the example shown in FIG. 3, the second computing node is the first to successfully validate the first transaction. Upon successfully validating the first transaction, the second computing node attempts to prove fulfillment of the terms of the smart contract (block 306). As an example, if the smart contract indicates that a receptor node provide a reciprocal transaction value to the sender node in exchange for the specified transaction value, the receptor node can attempt to provide that sender node with the reciprocal transaction value.

In some implementations, the second computing node can transmit a second data record to the first computing node, representing a second proposed transaction, a second transaction value associated with the second proposed transaction (e.g., the reciprocal value), and a second smart contract associated with the second proposed transaction. In general, the second data record can be similar to the first data record described with reference to block 302, but represent a proposed transfer of the reciprocal value specified by the first data record.

Upon receiving the second data record, the first computing node attempts to validate the second transaction (block 308). In general, this validation process can be similar to the validation process described with reference to blocks 304a and 304b.

Upon successfully validating the second transaction, the first computing node receives the specified reciprocal transaction value, and records the completion of the second transaction to the distributed ledger (block 310).

Similarly, upon the first computing node successfully validating the second transaction, the second computing node receives the specified transaction value of the first transaction, and records the completion of the first transaction to the distributed ledger (block 312).

As described above, in some implementations, the computing nodes can receive the specified transaction values directly from one another. Further, in some implementations, the computing nodes can receive the specified transaction values indirectly from one another via an intermediary (e.g., the payment processor system 106 or some other system).

Further, records of the transactions are stored in the distributed ledger (block 314). For example, the first computing node and the second computing node can transmit respective data blocks to the distributed transaction network 102, and the distributed transaction network 102 can store the blocks as additional blocks in a chain of blocks of the distributed ledger. As described above, in some implementations, each block can be cryptographically signed in the chain, such that the blocks cannot be tampered with after they have been added to the distributed ledger.

In the example processes shown in FIGS. 2 and 3, multiple nodes can attempt to validate a transaction concurrently. However, in some implementations, the system 100 can be configured such that only one node can attempt to validate a transaction at a time.

Figure 4:
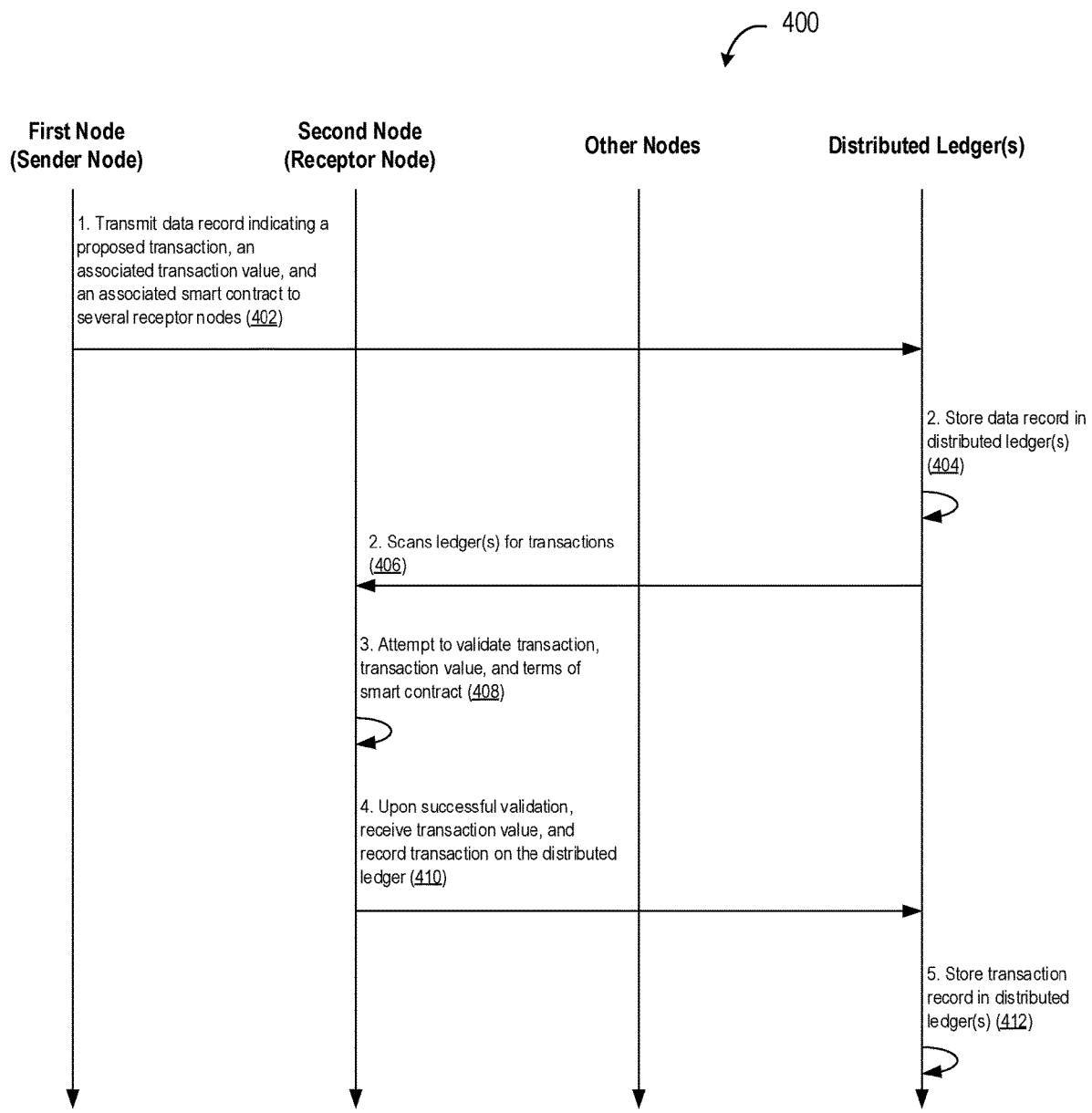
FIG. 4 is a flow chart diagram of another example process for operating a distributed transaction network, such as to advertise proposed transactions on a distributed ledger.

Also, in the examples shown in FIGS. 2 and 3, a first computing node transmits a data record directly to some other computing nodes regarding a proposed transaction. However, in some implementations, a first computing node can advertise a proposed transaction on the distributed ledger. In turn, the other computing nodes can scan the distributed ledger for proposed transactions, and attempt to complete one or more of the proposed transactions indicated in the distributed ledger. An example process 400 including this functionality is shown in FIG. 4.

According to the process 400, a first computing node transmits a first data record regarding a first proposed transaction for recordation to a distributed ledger (block 402).

In general, the data record can be similar to that described with reference to FIGS. 2 and 3. For example, the data record can include various information regarding the first proposed transaction, such as a transaction value associated with the first proposed transaction, and a smart contract associated with the first proposed transaction. However, in this example, the data record is transmitted to the distributed ledger for recordation, instead of each of the second computing node and other computing nodes directly.

The data record is stored in the distributed ledger (block 404). For example, the first computing node can transmit a data block to the distributed transaction network 102, and the distributed transaction network 102 can store the data block as an additional block in a chain of blocks of the distributed ledger. As described above, in some implementations, each block can be cryptographically signed in the chain, such that the blocks cannot be tampered with after they have been added to the distributed ledger.

Further, each of the second computing node and the other computing nodes scans the distributed ledger for proposed transactions (block 406). For example, each of the second computing node and the other computing nodes can retrieve at least a portion of the distributed ledger, and identify blocks of the distributed ledger corresponding to proposed transactions that have not yet been completed. Further, the second computing node and/or the other computing nodes can identify proposed transactions for potential validation and completion.

For instance, as shown in FIG. 4, upon identifying the proposed transaction by the first computing node, the second computing node attempts to validate the transaction (block 408). The second computing node can perform various operations to validate the first transaction, depending on the nature of the transaction.

For example, as described with reference to FIG. 2, if the transaction includes the transfer of a specified value from the sender node to a receptor node, the second computing node can attempt to verify that the sender node is in possession of the specified value or otherwise controls the disposition of the specified value. As another example, as described with reference to FIG. 2, if the data record includes a smart contract associated with the transaction, the second computing node can attempt to validate the terms of the smart contract.

Upon successfully validating the transaction, the second computing node receives the specified transaction value, and records the completion of the transaction to the distributed ledger (block 410). In some implementations, the second computing node can receive the specified transaction value directly from the first computing node. In some implementations, the second computing node can receive the specified transaction value indirectly from the first computing node via an intermediary (e.g., the payment processor system 106 or some other system).

Further, a record of the transaction is stored in the distributed ledger (block 412). For example, the second computing node can transmit a data block to the distributed transaction network 102, and the distributed transaction network 102 can store the block as an additional block in a chain of blocks of the distributed ledger. As described above, in some implementations, each block can be cryptographically signed in the chain, such that the blocks cannot be tampered with after they have been added to the distributed ledger.

Figure 5A:
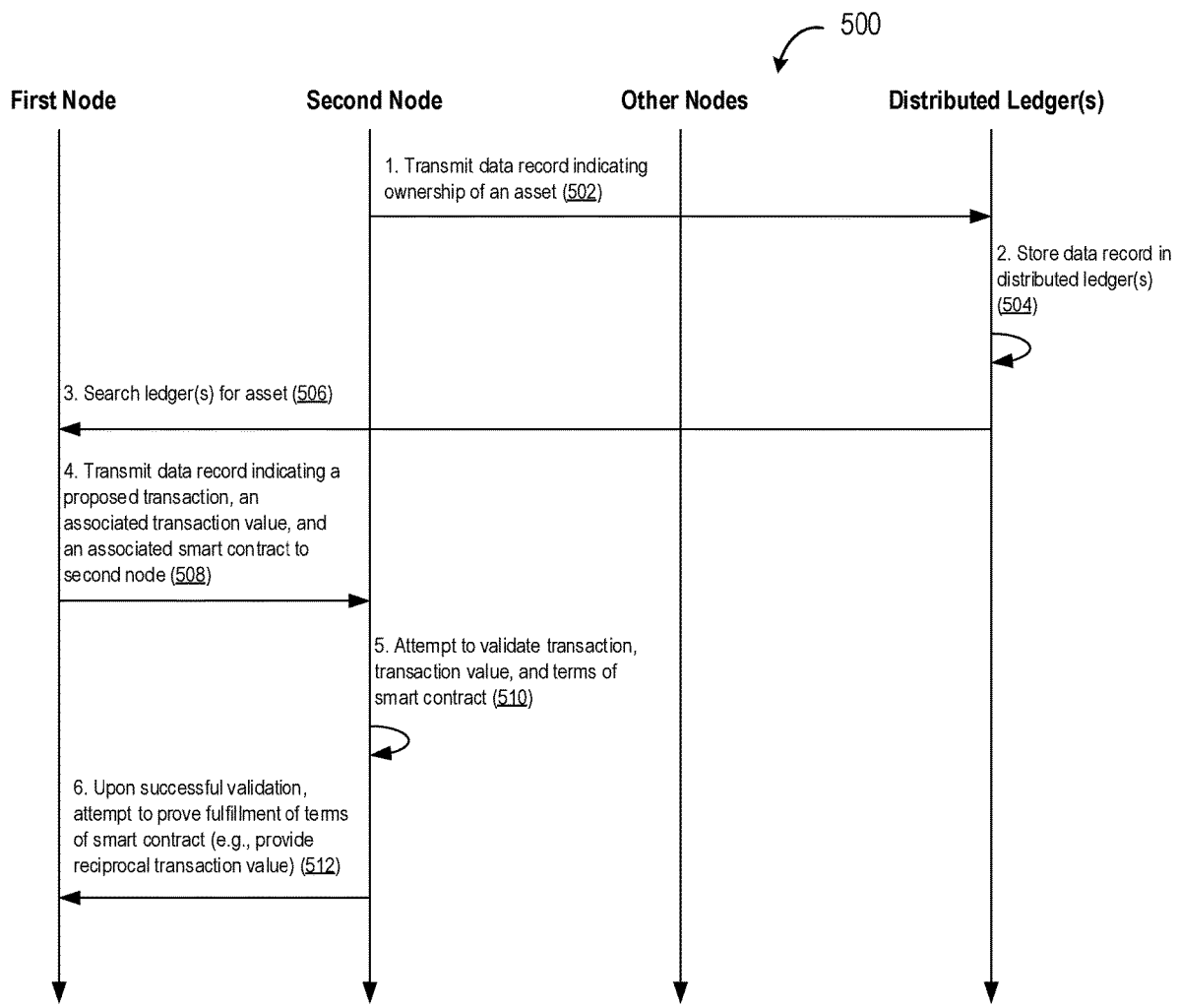
FIGS. 5A and 5B are flow chart diagrams of another example process for operating a distributed transaction network, such as to advertise ownership of assets for potential acquisition on a distributed ledger.
Figure 5B:
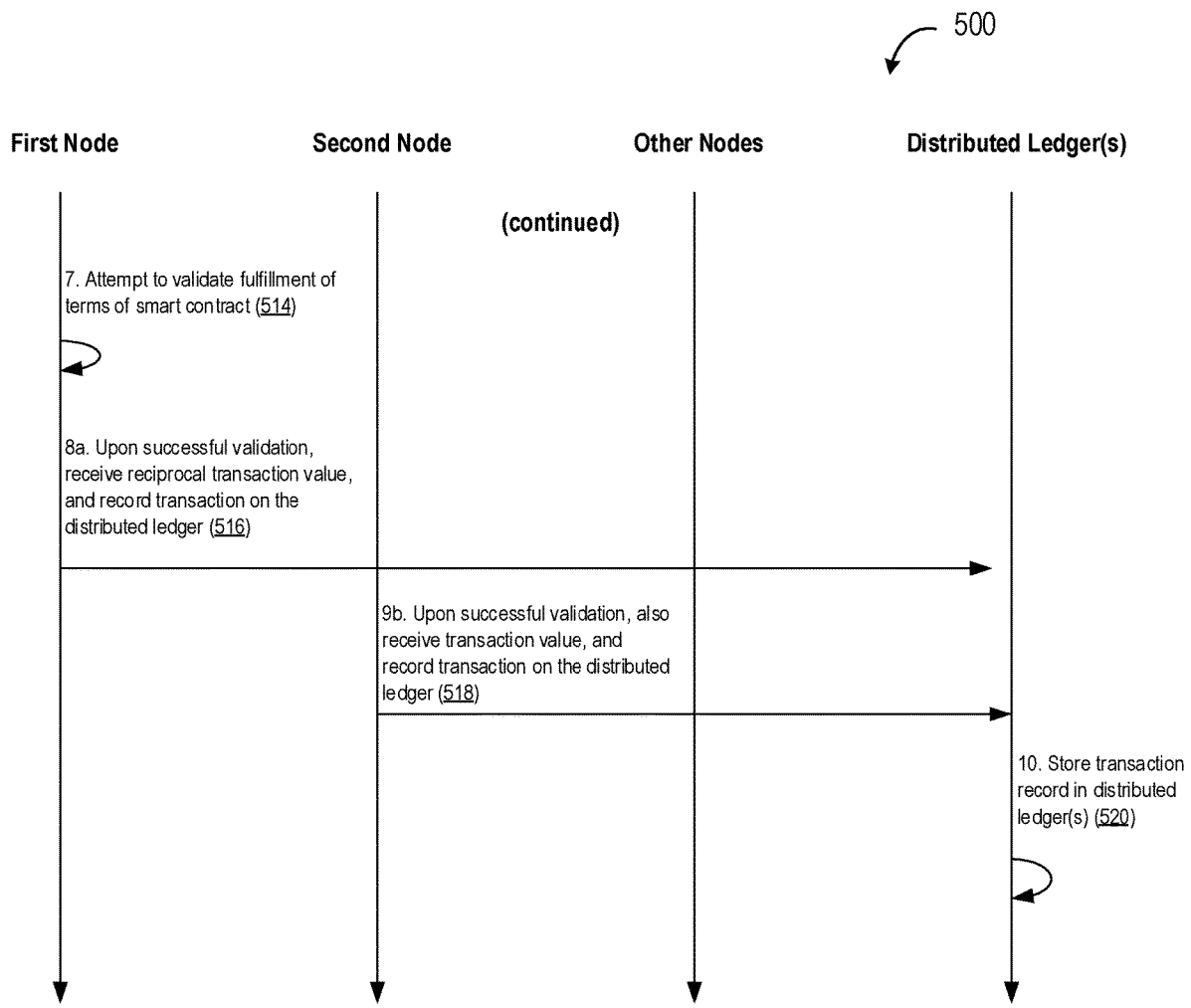

In the examples shown in FIGS. 2-4, a first computing node transmits data records to other computing nodes regarding a proposed transaction (e.g., either directly to the other computing nodes or indirectly via a distributed ledger). However, in some implementations, a computing node can advertise ownership of a particular item or other property on the distributed ledger. In turn, the other computing nodes can scan the distributed ledger for items or other property owned by others, and propose transactions to acquire those items or other property. An example process 500 including this functionality is shown in FIGS. 5A and 5B.

According to the process 500, a second computing node transmits a first data record regarding the ownership of an asset for recordation to a distributed ledger (block 502). As an example, the first data record (e.g., a "PoRtion") can identify the asset, the location of the asset (e.g., in the case of a physical asset), the owner (or owners) of the asset, and any other details regarding the asset.

The first data record is stored in the distributed ledger (block 504). For example, the second computing node can transmit a data block to the distributed transaction network 102, and the distributed transaction network 102 can store the data block as an additional block in a chain of blocks of the distributed ledger. As described above, in some implementations, each block can be cryptographically signed in the chain, such that the blocks cannot be tampered with after they have been added to the distributed ledger.

Further, each of the other computing nodes scans the distributed ledger for assets for potential acquisition (block 506). For example, each of the first computing node and the other computing nodes can retrieve at least a portion of the distributed ledger, and identify blocks of the distributed ledger corresponding to assets that are available for acquisition. Further, the first computing node and/or the other computing nodes can identify a particular asset for potential acquisition.

For instance, as shown in FIG. 5A, upon identifying the asset advertised by the second computing node, the first computing node can transmit a second data record to the second computing node, indicating a first proposed transaction for the advertised asset in exchange for a specified transaction value (block 508). In general, the second data record can be similar to that described with reference to FIG. 3, block 302 (e.g., in order to facilitate the performance of a bilateral transaction).

In general, the remainder of the process 500 can be performed in a similar manner as described with reference to FIG. 3.

For example, upon receiving the second data record from the first computing node, the second computing node can attempt to validate the first transaction (block 510). The second computing node can perform various operations to validate the first transaction, depending on the nature of the transaction.

For example, as described with reference to FIG. 3, if the first transaction includes the transfer of a specified value from the sender node to a receptor node, the second computing node can attempt to verify that the sender node is in possession of the specified value or otherwise controls the disposition of the specified value. As another example, as described with reference to FIG. 3, if the second data record includes a smart contract associated with the first transaction, each of these computing nodes can attempt to validate the terms of the smart contract.

Upon successfully validating the first transaction, the second computing node attempts to prove fulfillment of the terms of the smart contract (block 512). As an example, if the smart contract indicates that a receptor node provide a reciprocal transaction value (e.g., the advertised asset) to the sender node in exchange for the specified transaction value, the receptor node can attempt to provide that sender with the reciprocal transaction value.

In some implementations, the second computing node can transmit a third data record to the first computing node, representing a second proposed transaction, a second transaction value associated with the second proposed transaction (e.g., the reciprocal value, such as the advertised asset), and a second smart contract associated with the second proposed transaction. In general, the third data record can be similar to the first or second record described with reference to block 508, but represent a proposed transfer of the reciprocal value specified by the second data record.

Upon receiving the third data record, the first computing node attempts to validate the second transaction (block 514). In general, this validation process can be similar to the validation process described with reference to blocks 304a, 304b, and 510.

Upon successfully validating the second transaction, the first computing node receives the specified reciprocal transaction value (e.g., the advertised asset), and records the completion of the second transaction to the distributed ledger (block 516).

Similarly, upon the first computing node successfully validating the second transaction, the second computing node receives the specified transaction value of the first transaction, and records the completion of the first transaction to the distributed ledger (block 518).

In the example shown in FIGS. 5A and 5B, a computing node (e.g., the second computing node) publicizes ownership of an asset using the distributed ledger. However, in practice, a computing node can also publicize the availability of a service using the distributed ledger. For example, an entity associated with a computing node may wish to offer his services to others, such as the performance of a particular action or task. Using a computing node, the entity can publicize details regarding the offered service on the distributed ledger, such as the identity of the service, an associated location or geographical area for that service (if appropriate), and any other details regarding the service (e.g., in a similar manner as described with reference to blocks 502 and 504). Accordingly, other entities (e.g., an entity associated with the first computing node) can identify services that are available for performance, and to propose a transaction to obtain a particular service in exchange for a particular transaction value (e.g., in a similar manner as described with reference to blocks 506 and 508).

Further, in the example shown in FIGS. 5A and 5B, a computing node (e.g., the second computing node) publicizes ownership of an asset and/or an availability of a service using the distributed ledger. However, in practice, a computing node can publicize ownership of an asset and/or an availability of a service directly to one or more other computing nodes. For example, a computing node can transmit data to one or more other computing nodes that indicates the ownership of an asset and/or an availability of a service, and any other details regarding that asset or service. In response, the other computing nodes can propose a transaction to obtain the asset or service in exchange for a particular transaction value (e.g., in a similar manner as described with reference to block 508).

As described above, in some implementations, the computing nodes can receive the specified transaction values directly from one another. Further, in some implementations, the computing nodes can receive the specified transaction values indirectly from one another via an intermediary (e.g., the payment processor system 106 or some other system).

Further, records of the transactions are stored in the distributed ledger (block 520). For example, the first computing node and the second computing node can transmit respective data blocks to the distributed transaction network 102, and the distributed transaction network 102 can store the blocks as additional blocks in a chain of blocks of the distributed ledger. As described above, in some implementations, each block can be cryptographically signed in the chain, such that the blocks cannot be tampered with after they have been added to the distributed ledger.

Figure 6A:
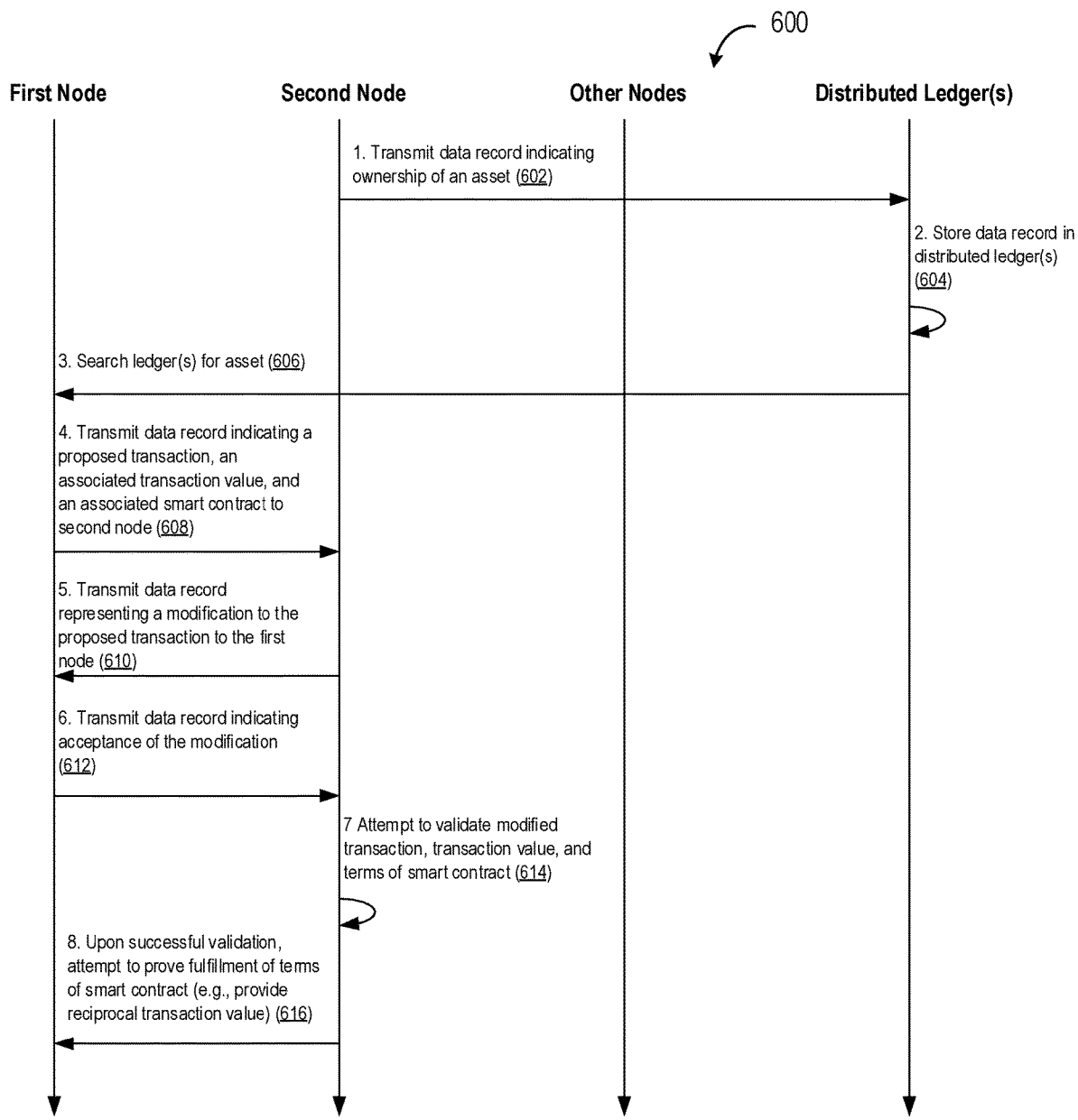
FIGS. 6A and 6B are flow chart diagrams of another example process for operating a distributed transaction network, such as to advertise ownership of assets for potential acquisition on a distributed ledger.
Figure 6B:
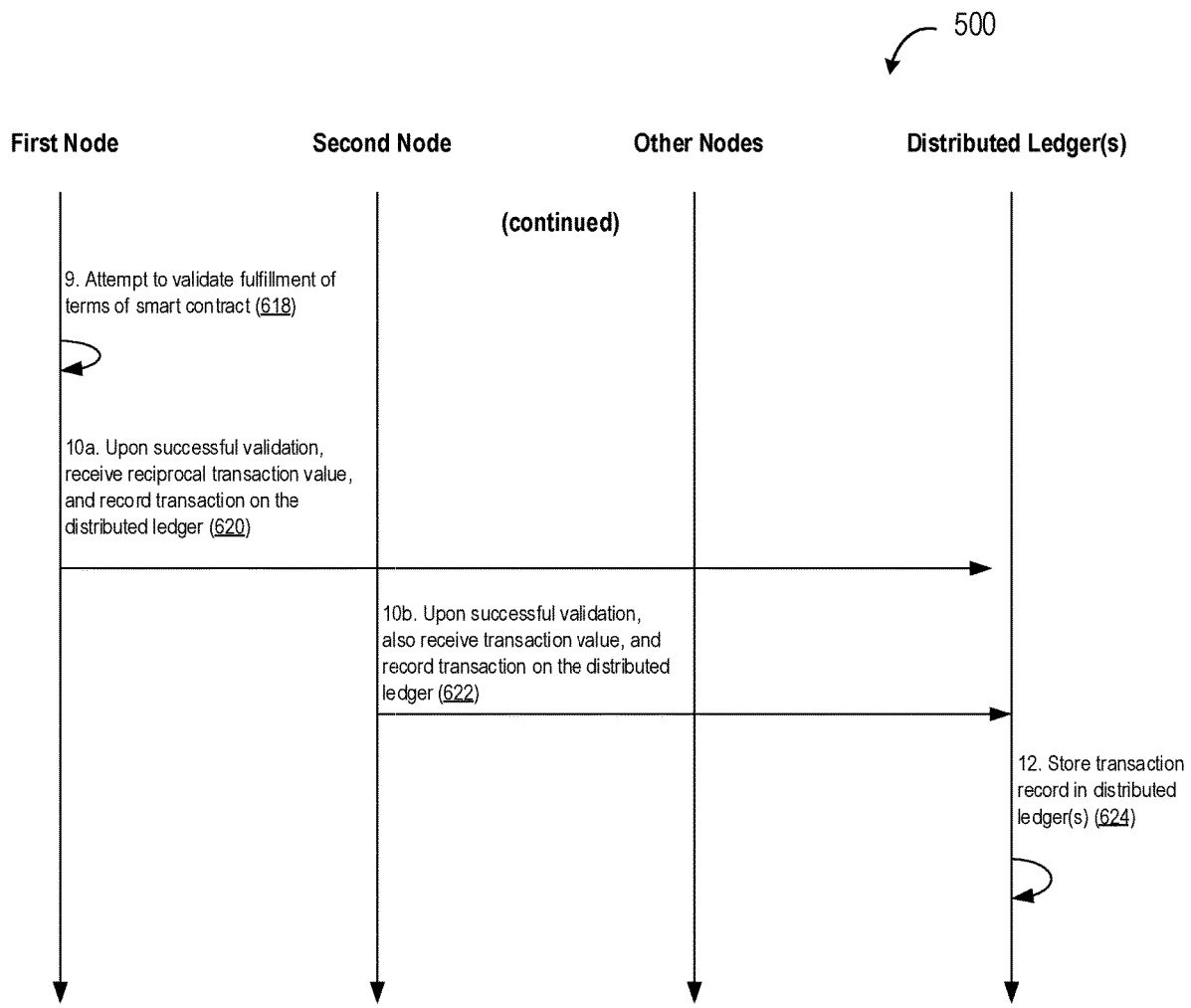

In the example shown in FIGS. 5A-5B, the second computing node can accept a transaction proposed by the first computing node, according to terms and conditions specified by the first computing node. However, in some implementations, the second computing node can instead make a counter offer to the first computing node (e.g., by proposing one or more modifications to the proposed transaction). An example process 600 including this functionality is shown in FIGS. 6A and 6B.

According to the process 600, a second computing node transmits a first data record regarding the ownership of an asset for recordation to a distributed ledger (block 602). As an example, the first data record (e.g., a "PoRtion") can identify the asset, the location of the asset (e.g., in the case of a physical asset), the owner (or owners) of the asset, and any other details regarding the asset.

The first data record is stored in the distributed ledger (block 604). For example, the second computing node can transmit a data block to the distributed transaction network 102, and the distributed transaction network 102 can store the data block as an additional block in a chain of blocks of the distributed ledger. As described above, in some implementations, each block can be cryptographically signed in the chain, such that the blocks cannot be tampered with after they have been added to the distributed ledger.

Further, each of the other computing nodes scans the distributed ledger for assets for potential acquisition (block 606). For example, each of the first computing node and the other computing nodes can retrieve at least a portion of the distributed ledger, and identify blocks of the distributed ledger corresponding to assets that are available for acquisition. Further, the first computing node and/or the other computing nodes can identify a particular asset for potential acquisition.

For instance, as shown in FIG. 6A, upon identifying the asset advertised by the second computing node, the first computing node can transmit a second data record to the second computing node, indicating a proposed transaction for the advertised asset in exchange for a specified transaction value (block 608). In general, the second data record can be similar to that described with reference to FIG. 3, block 302 (e.g., in order to facilitate the performance of a bilateral transaction).

The second computing node can decline the proposed transaction as specified by the first computing node, and instead propose one or more modifications to the proposed transaction. As an example, the second computing node can transmit a third data record to the first computing node, indicating one or more modifications to the proposed transaction (block 614). Example modifications include modifications to the value that would be exchanged by the first and second computing nodes (e.g., a modification to the asset offered by the second computing node and/or a modification to the specified transaction value offered by the first computing node in exchange for the asset). Other example modifications include modifications to one or more of the terms or conditions of the proposed transaction. In general, the third data record can be similar to that described with reference to FIG. 3, block 302 (e.g., in order to facilitate the performance of a bilateral transaction).

Further, the first computing node can determine whether to accept the modifications proposed by the second computing node, and transmit data to the second computing node indicating whether the proposed modifications are acceptable or unacceptable. For example, the first computing node can transmit a fourth data record indicating acceptance of the modification by the first computing node (block 612).

In general, the remainder of the process 600 can be performed in a similar manner as described with reference to FIGS. 3, 5A and 5B.

For example, upon receiving the fourth data record from the first computing node, the second computing node can attempt to validate the modified transaction (block 614). The second computing node can perform various operations to validate the modified transaction, depending on the nature of the transaction.

For example, as described with reference to FIG. 3, if the modified transaction includes the transfer of a specified value from the sender node to a receptor node, the second computing node and can attempt to verify that the sender node is in possession of the specified value or otherwise controls the disposition of the specified value. As another example, as described with reference to FIG. 3, if the modified transaction is associated with a smart contract, each of these computing nodes can attempt to validate the terms of the smart contract.

Upon successfully validating the modified transaction, the second computing node attempts to prove fulfillment of the terms of the smart contract (block 616). As an example, if the smart contract indicates that a receptor node provide a reciprocal transaction value (e.g., the advertised asset) to the sender node in exchange for the specified transaction value, the receptor node can attempt to provide that sender with the reciprocal transaction value.

Further, the first computing node attempts to validate the modified transaction (block 618). In general, this validation process can be similar to the validation process described with reference to blocks 304*a*, 304*b*, and 510.

Upon successfully validating the modified transaction, the first computing node receives the specified reciprocal transaction value (e.g., the advertised asset), and records the receipt to the distributed ledger (block 620).

Similarly, upon the first computing node successfully validating the modified transaction, the second computing node receives the specified transaction value of the first transaction, and records the receipt to the distributed ledger (block 622).

In some implementations, the first computing node can transmit the specified transaction value simultaneously and/or concurrently with the second computing node transmitting the specified reciprocal transaction value.

Further, records of the transactions are stored in the distributed ledger (block 624). For example, the first computing node and the second computing node can transmit respective data blocks to the distributed transaction network 102, and the distributed transaction network 102 can store the blocks as additional blocks in a chain of blocks of the distributed ledger. As described above, in some implementations, each block can be cryptographically signed in the chain, such that the blocks cannot be tampered with after they have been added to the distributed ledger.

In some implementations, a first and second nodes can "lock" the advertised asset and/or the reciprocal value, such that the advertised asset and/or the reciprocal value cannot be transferred to other entities prior to the completion of the transaction.

As an example, referring to FIGS. 5A and 5B, the first computing node can lock the advertised asset to the second node concurrently with transmitting a data record regarding the proposed transaction for the advertised asset to the second node (e.g., block 508). The lock can be configured such that the advertised asset can only be transferred to the first node (e.g., step 512) while the transaction is pending. The lock can be removed if the transaction is canceled by one or more of the computing nodes, or upon expiration of a specified amount of time (e.g., specified by the smart contract).

As another example, referring to FIGS. 5A and 5B, the second computing node can lock the specified value to the first node concurrently with providing the advertised asset to the first node (e.g., block 512). The lock can be configured such that the specified value can only be transferred to the second node (e.g., step 516) while the transaction is pending. The lock can be removed if the transaction is canceled by one or more of the computing nodes, or upon expiration of a specified amount of time (e.g., specified by the smart contract).

As another example, referring to FIGS. 6A and 6B, the first computing node can lock the advertised asset to the second node concurrently with transmitting a data record regarding acceptance of the modified transaction for the advertised asset to the second node (e.g., block 612). The lock can be configured such that the advertised asset can only be transferred to the first node (e.g., step 616) while the transaction is pending. The lock can be removed if the transaction is canceled by one or more of the computing nodes, or upon expiration of a specified amount of time (e.g., specified by the smart contract).

As another example, referring to FIGS. 6A and 6B, the second computing node can lock the specified value to the first node concurrently with providing the advertised asset to the first node (e.g., block 616). The lock can be configured such that the specified value can only be transferred to the second node (e.g., step 620) while the transaction is pending. The lock can be removed if the transaction is canceled by one or more of the computing nodes, or upon expiration of a specified amount of time (e.g., specified by the smart contract).

Additional details regarding the locking of value is provided below.

As described above, the distributed transaction network 102 can facilitate the performance of electronic transactions according to a proof of reception validation protocol, whereby a potential recipient of value from the transaction (e.g., a transaction node 104) validates one or more aspects of the transaction prior to receiving the value. Further, the transaction node 104 can record information regarding the successful completion of the transaction in the distributed ledger 150, such that information can be retrieved by others.

In some implementations, a transaction node 104 can perform at least three categories of operations: (i) Validation, (ii) Transfer, and (iii) Record. Each of these categories of operations are described in further detail below.

Validation:

In general, the Validation operations are performed to validate one or more aspects of the transaction prior to receiving the value.

Validation operations can include (a) Store, (b) Search, (c) Lock, (d) Confirm, and (e) Prove.

(a) Store: These operations enable a transaction node 104 to store information regarding value held by users and/or transactions of value performed by users in the distributed ledger 150 and/or using some other storage medium (e.g., centralized databases, decentralized databases, local storage devices, network-enabled storage devices, etc.). In some implementations, the Store operations can include importing data from third party systems 122 (e.g., using the data interface system 120), and recording at least some of the imported data in the distributed ledger 150 (e.g., using the distributed transaction network 102) and/or using some other storage medium. In some implementations, the distributed ledger 150 may be referred to as a "PoRtfolio" (e.g., POR transaction folder input-output). In some implementation, a "Portfolio" may refer to any other storage of data regarding the value held by users and/or transactions of value performed by users (e.g., data stored on centralized databases, decentralized databases, local storage devices, network-enabled storage devices, etc.)

(b) Search: These operations enable a transaction node 104 to search for specific values stored in the distributed ledger 150 and/or using some other storage medium. The search can be performed based on one or more criteria (e.g., categories of value, the amount of value, the time in which the value is available for transaction, the entity that is offering the value, the location associated with the value, etc.).

These operations also enable a transaction node 104 to search for a candidate recipient for value held by the transaction node 104. The search can be performed based on one or more criteria (e.g., an identity of the recipient, characteristics of the recipient, etc.). In some implementations, the search can be performed by identifying candidate recipients that meet a particular set of eligibility requirements for receiving the value. In some implementation, the search can be performed based on data stored in a smart contract (e.g., a "PoRtraits") and/or a user's profile information (e.g., information that describes the characteristics of the user, actions previously performed by the user, previously conducted transactions by the user, a Reception Score of the user, "friends" or other users with whom the user is associated, and/or other information regarding the user).

In some implementations, upon identifying a suitable recipient, a transaction node 104 can automatically transmit the value to the identified recipient. In some implementations, upon identifying a suitable recipient, a transaction node 104 can notify a user of the identified recipient, and transmit the value to the identified recipient upon receiving manual confirmation from the user.

(c) Lock: These operations enable a transaction node 104 to lock value held by another transaction node 104 in anticipation of a transaction between them. This can be beneficial, for example, in preventing the transfer of value away from the other transaction node prior to the completion of the transaction (e.g., such that the other transaction node cannot "double spend" the same value on multiple transactions).

For example, a proposed transaction may include a transfer of a first value held by a first transaction node to a second transaction node, in exchange for a second value held by the second transaction node. The first transaction node can lock the second value held by the second transaction node (e.g., such that the second transaction node cannot transfer the value to another entity prior to the completion of the transaction). Further, the second transaction node can lock the first value held by the first transaction node (e.g., such that the first transaction node cannot transfer the value to another entity prior to the completion of the transaction).

In some implementations, value can be locked by preventing the distributed transaction network 102, the transaction nodes 104, and/or the payment processor system 106 from processing any other transactions involving the specified value, prior to the completion of the transaction at hand.

In some implementations, value can be locked by preventing the distributed transaction network 102, the transaction nodes 104, and/or the payment processor system 106 from recording information regarding other transactions involving the specified value (e.g., using the distributed ledger 150 and/or any other storage medium), prior to the completion of the transaction at hand.

In some implementations, value can be locked holding the value in escrow. For example, value can be transferred to an escrow account controlled by a neutral entity to the transaction (e.g., an administrator of the distributed transaction network 102, or some other entity).

In some implementations, the distributed transaction network 102 can enable a transaction node 104 to perform only a single transaction at a time. For example, while the transaction node 104 is performing a transaction, the transaction node 104 can be restricted from initiating and/or performing any other transactions (e.g., until the completion or cancellation of the pending transaction). As another example, while the transaction node 104 is performing a transaction, the transaction node 104 can be restricted from conducting transactions with one or more other computing nodes prior to validation of the transaction.

(d) Confirm: These operations enable a transaction node 104 to self-validate ownership (e.g., the provenance) of a proposed value for a transaction. In some implementations, these operations can include accessing the distributed ledger 150, and determining whether the proposed value for the transaction is indeed held by the other party to the transaction (also referred to as a "rePoRt," or "reciprocal PoRt). In some implementations, these operations can include accessing other data stored by the distributed transaction network 102, and determining whether the proposed value for the transaction is indeed held by the other party to the transaction (the "rePoRt"). In some implementations, these operations can include assessing data provided by the data interface system 120 (e.g., the "PoRtal"), and determining whether the proposed value for the transaction is indeed held by the other party to the transaction (the "rePoRt"). For example, a proposed transaction may include a transfer of a first value held by a first transaction node to a second transaction node, in exchange for a second value held by the second transaction node. The first transaction node can confirm that the second transaction node is currently holding the second value (e.g., by determining whether the distributed ledger 150 and/or some other store of data indicates that this is the case). Further, the second transaction node can confirm that the first transaction node is currently holding the first value (e.g., by determining whether the distributed ledger 150 and/or some other store of data indicates that this is the case).

(e) Prove: These operations enable a transaction node 104 to self-validate other aspects of a proposed transaction. As an example, if the proposed transaction includes terms or conditions specified in the form of a smart contract, the Prove operations can include validating that each of the terms or conditions have been met (e.g., using the distributed ledger 150 and/or some other store of data). As another example, if the smart contract specifies other information (e.g., "PoRtraits") regarding the proposed transaction, the Prove operations can include validating that the specified information is accurate (e.g., using the distributed ledger 150 and/or some other store of data). PoRtraits: Example information includes Sender Node (SN) Proof of Reception Terminal (PORT) Address, Receptor Node (RN) PORT Address, SN Specified Value (SV) Exchanged, RN SV Exchanged: Database Source(s) (DS) for Validation, SV Categories, SV Mode, Specified Value Sequence (SVS), eligibility requirements, time limit, timestamp(s), identity, rating, and Validation (e.g., as described above with reference to smart contracts). Other example information includes a score or rating that is calculated based on a transaction node's speed, accuracy, and/or frequency of validation (e.g., also referred to as a "PoRating," "Reception Score," or "Trust Algorithm"), which enables transaction nodes to prioritize certain transaction nodes over others then performing and/or validating transactions. In some implementations, this information may be referred to as a "PoR-traits."

In some implementations, the "PoRating." "Reception Score," or "Trust Algorithm," A, can be calculated using the relationship:

$$A=PoR*(x+y+z) \qquad \text{Eq. 1,}$$

where POR is a metric representing a number of transactions performed by the transaction node, X is a metric representing the accuracy of transactions performed by a transaction node, Y is a metric representing the speed of transactions performed by a transaction node, X is a metric representing the frequency of transactions performed by a transaction node.

In some implementations, a transaction node 104 can self-validate a transaction upon receiving the proposed value of the transaction. For example, if a transaction includes transmitting a particular proposed value to the transaction node 104, the transaction node 104 can validate the transaction upon receipt of that proposed value. Further upon validating the proposed transaction, the transaction node 104 can add a transaction record to a distributed ledger of the distributed transaction network to indicate receipt of the proposed value (as described in further detail below).

Transfer:

The Transfer operations are performed after completion of the Validation operations. In general, the Transfer operations are performed to transfer value from one entity to another (e.g., using the distributed transaction network 102, the payment processor 106, the third party systems 122 and/or directly with one another).

For example, a proposed transaction may include a transfer of a first value held by a first transaction node to a second transaction node, in exchange for a second value held by the second transaction node. Upon completion of the Validation operations, the first transaction node can transfer the first value to the second transaction node (e.g., using the distributed transaction network 102, the payment processor 106, the third party systems 122, and/or directly with one another). Further, the second transaction node can transfer the second value to the first transaction node (e.g., using the distributed transaction network 102, the payment processor 106, and/or the third party systems 122).

Record:

The Record operations are after completion of (or concurrently with) the Transfer operations. In general, the Record operations are performed to record information regarding a transfer of value in the distributed ledger 150.

For example, a proposed transaction may include a transfer of a first value held by a first transaction node to a second transaction node, in exchange for a second value held by the second transaction node. Upon (on concurrently with) completion of the Transfer operations, the first transaction node and/or the second transaction node can record information regarding the completed transaction in the distributed ledger 150 or some other data storage medium (e.g., information confirming the completion of the transaction, the transferred value(s), the parties to the transaction, the time the transaction was performed, the location of the transaction, etc.). In some implementations, information can be recorded manually by the first transaction node and/or the second transaction node. In some implementations, information can be recorded automatically by the first transaction node and/or the second transaction node. In some implementations, it may be preferable for information to be stored automatically (e.g., to prevent a transaction node from receiving a transaction value, but not recording information regarding the receipt of the transaction value).

In some implementations, the Record operations can also be used to record information corroborating the completion of the transfer in the distributed ledger 150. For instance, using the Record operations, a transaction node 104 can record videos, images, text, audio, etc. regarding the transaction. As an example, the videos, images, text, audio, etc. can depict the performance of the transaction (e.g., a recording of the transaction). As another example, the videos, images, text, audio, etc. can include statements by users attesting to the performance of the transaction. As another example, the videos, images, text, audio, etc. can include information confirming the details of the transaction.

In some implementations, the Record operations can also be used to record a security signature, cryptographic key, "link signature," and/or biometric information of one or more of the parties to the transaction (also referred to as the parties "VITALS"). For example, using the Record operations, a transaction node 104 can record the security signature, cryptographic key, link signature, and/or biometric information of (i) the entity that is associated with the transaction node 104 and/or (ii) the entity with whom the transaction was performed.

In some implementations, once both parties' VITALS are confirmed according to items (i) and (ii), Proof of Reception is complete, and the transaction is considered complete and immutable. Further, if an active transaction never culminates in confirmation of the parties' VITALS according to both items (i) and (ii), Proof of Reception is considered incomplete, and the transaction is considered incomplete and is not recorded. In some implementations, an incomplete transaction may expire or terminate, upon expiry of a specified amount of time (e.g., as specified in the smart contract for the transaction). Further, information regarding the expired transaction may be deleted from one or more of the components of the system 100.

As described above, in some implementations, a transaction node 104 can self-validate a transaction upon receiving the proposed value of the transaction. Upon validating the proposed transaction, the transaction node 104 can add a transaction record to a distributed ledger of the distributed transaction network to indicate receipt of the proposed value. In some implementations, the transaction node 104 can also add a signature unique to the second computing node (e.g., a PoR signature) to the distributed ledger to finalize the validation and indicate the finality of the transaction. In some implementations, this validation and recordation can be performed without any additional validating actions performed by third parties (e.g., third party miners in a proof of work consensus mechanism and/or third party stakers in a proof of stake consensus mechanism).

In some implementations, transaction nodes can provide each other with signatures concurrently and/or simultaneously as a part of the validation process. As an example, a first transaction node can transmit a signature (e.g., a signature that is unique to the first transaction node) to a second transaction node. Concurrently and/or simultaneously, the second transaction node can transmit a signature (e.g., a signature that is unique to the second transaction node) to the first transaction node.

In some implementations, the exchange of value is contingent on the transaction nodes providing each other with valid signatures. For example, the transaction nodes can refrain from exchanging value until each of the signatures has been validated.

Other Operations:

In general, system 100 can implement various automated defense mechanisms to prevent (or otherwise reduce) fraud. Example defense mechanisms include (1) "PoRt Double Lock," (2) "PoRtraits Validation Incentive," (3) "PoRtions Collateral Risk," and (4) "PoRating."

In some implementations, a neutral third party can hold value in escrow for two or more transacting parties, such that parties cannot "double spend" the same value on multiple transactions (e.g., as described above). Further, each transaction node can be restricted to engaging with only one other transaction node at a time from the beginning of a transaction (e.g., validation) to the end of the transaction (e.g., transferring value and/or recording information regarding the transaction). In some implementations, during each transaction, a transaction node (e.g., without any other third party, such as a neutral party), can (i) self-lock value held by the transaction node and/or (ii) lock value held by the other transaction node that is party to the transaction. Locking can be performed by preventing the transfer of value using the distributed ledger 150, using some other data storage (e.g., data stored on local or network storage), and/or using the data interface system 120. For example, locking can be performed by securing a bilateral connection between the two transaction nodes so each transaction node can lock the other transaction node's transaction value locally at each transaction node's storage ledger, on the distributed ledger, or elsewhere on some other system (e.g., a third party system, such as a financial institution's system, via an application programming interface). Further, each transaction node can self-validate their respective value prior to exchanging the values locally at each transaction node's storage ledger, on the distributed ledger, or elsewhere on some other system (e.g., a third party system via an API). This may be referred to as a "PoRt Double Lock," as both transaction nodes are locking each other's value during the proof of reception process.

In some implementations, the system 100 can ensure that values are only transferred from one transaction node to another transaction node only if the recipient of the value successfully (i) confirms ownership of the value by the sender and (ii) confirms that each of the terms or conditions of the smart contract (e.g., PoRtraits) are satisfied. This may be referred to as "PoRtraits Validation Incentive," as every recipient of value is incentivized to accurately validate the smart contract in order to receive the value. Otherwise, the value is not transferred to the recipient.

As another example, the system 100 (e.g., using the proof of reception systems and technique described herein) can automatically detect inconsistencies between information provided by a transaction node 104 and information stored in the distributed ledger 150 and/or other stores of data. Further, the system 100 can automatically detect fraudulent activity by a transaction node 104. Further still, the system 100 can selectively remove transaction nodes 104 from the system 100 (e.g., by preventing those transaction nodes 104 accessing the distributed transaction network 102) in order to maintain the security of the system 100. For example, if a particular transaction node 104 performs (or attempts to perform) fraudulent transactions using the system 100, the system 100 can revoke that transaction node's access privileges to the distributed transaction network 102. In some implementations, assets held by that transaction node can be relinquished to others, donated to others, or destroyed. In some implementations, this may be referred to as "PoRtions Collateral Risk," as a transaction node would automatically lose all of its held value if the transaction node attempts to commit fraud.

As another example, the system 100 can assign ratings to each of the transactions nodes 104 (also referred to as a "PoRating"). As described above, a rating is as metric representing a quality of a particular transaction node, and can depend on factors such as the accuracy of the validation performed by that transaction node, the speed of the validation of that transaction node, and/or the frequency in which the transaction node performs validations. In some implementations, a transaction node 104 can determine whether to perform a transaction with other transaction nodes 104 based on the ratings of those transaction nodes (e.g., by identifying transaction nodes having ratings that are sufficiently high, such as above a particular threshold value). In some implementations, a transaction node 104 can prioritize performing transactions with certain transaction nodes 104 based on the ratings of those transaction nodes (e.g., by prioritizing highly rated transaction nodes over lowly rated transaction nodes).

Biometrics:

In some implementations, transaction nodes can exchange value based on the receipt of biometric information that validates the identity of one or more users of the transaction nodes. Example biometric information includes fingerprints, palm prints, images or scans of a person's face, images or scans of a person's eyes, among others.

As an example, in order to receive value from a first transaction node, a second transaction node may be required to provide biometric information regarding a user of the second transaction node (e.g., to validate the identity of the user and/or to verify that the user is the intended recipient of the value). In some implementations, the second transaction node can provide the biometric information to the first transaction node using a proof of reception validation protocols (e.g., as described above), and in return, receive the value from the first transaction node using the proof of reception validation protocol (e.g., as described above).

In some implementations, the biometric information that is required to receive the value can be specified in a smart contract that controls the execution of the transaction. As an example, the required biometric information can be specified in a smart contract data field as a part of "PoRtraits" (e.g., as described above).

In some implementations, a smart contact can specify that a transaction node receives a particular value upon providing the specific biometric data. In some implementations, a smart contact can specify that a transaction node receives a particular value upon providing the specific biometric data in conjunction with providing other identifying information and/or performing certain tasks. In some implementations, a smart contact can specify that a transaction node receives a particular value upon providing the required information and/or performing the required tasks within a particular time limit.

Additional "PoRtraits" Examples

In some implementations, "PoRtraits" can refer to a profile of a transaction node (e.g., a "PoRt") and/or a transaction value (e.g., "PoRtions," in addition to referring to smart contracts and/or smart contract data fields).

Local Ledger—PoRt PoRtraits: In some implementations, each transaction node ("PoRt") can have a local ledger ("Portraits") of values ("PoRtions") recorded by the proof of reception of reciprocal transaction nodes ("rePoRts") representing the transaction nodes transaction history.

Value Internal Ledger—PoRtion PoRtraits: In some implementations, each instance of value ("PoRtion") can have a local ledger ("PoRtrait") within the value itself. In this case, the "PoRtraits" can represent the value's ownership history of transaction nodes culminating with the latest transaction node owner of the respective value. Each transaction node owner can be recorded into the value's "PoRtraits" upon receipt of each transaction node's unique proof of reception signature, which can be activated by a unique identifier (e.g., biometric information) of the respective transaction node demonstrating proof of reception.

In some implementations, in the event there is no database ("Portfolio") outside of the transaction nodes ("PoRts") and/or values ("PoRtions"), the smart contract data fields ("PoRtraits") of the transaction nodes and/or values can act as the ledgers of the respective transaction nodes and/or values.

In some implementations, in the event there is a database ("Portfolio") that exists (e.g., distributed ledger, centralized database, etc.), then the "PoRtraits" may or may not serve as a ledger in addition to its primary function as smart contract data fields for proof of reception "rePoRt" validation.

In some implementations, the techniques described herein can facilitate at least a three-factor authentication technique. For example, the techniques described herein can be performed to validate ownership of a transaction node based on (i) the trait of the "PoRtraits" within the value ("PoRtion") and (ii) the two databases ("Portfolios") of the each the sending transaction node ("PoRt") and the receiving transaction node ("rePoRt"), respectively, following the proof of reception of the value in addition to the transaction node's ("PoRt's") unique identifier (e.g., biometric information) that uniquely signs each proof of reception.

In some implementations, "PoRtraits" can include 12 or more programmable traits that provide more robust, specific, and automated security, and can ensure that the proof of reception of a "rePoRt" matches the proof of reception of each of the "Portraits" of the "PoRt's" "PoRtions" prior to completing proof of validation, transfer, and/or recording.

Although the examples above describe a proof of reception validation protocol in the context of a blockchain, in practice, a proof or reception validation protocol can be used with any other type of distributed ledger, either instead of or in addition to a blockchain. For example, a proof or reception validation protocol can be used with a tangle-based distributed ledger and/or a hashgraph-based distributed ledger.

Further, although the examples above describe a proof of reception validation protocol in the context of a distributed ledger, in practice, a proof or reception validation protocol can be used with any other data structure or database, either instead of or in addition to a distributed ledger.

As an example, although FIGS. 1-5B depict the storage of various data on a distributed ledger, in practice, data can be stored on a network-enabled database (e.g., either instead of being stored on a distributed ledger, or in addition to being stored on a distributed ledger). In some implementations, a database can be implemented using a cloud-based computer system (e.g., a distributed network of one or more computer devices and associated data storage devices). In some implementations, a database can be implemented using a single computer system that is communicatively coupled to a communications network (e.g., a centralized database that can be accessed by one or more transaction nodes via the communications network).

Further, in some implementations, data can be stored on a database that is local to a particular transaction node 104. For example, a transaction node 104 can use a proof of reception validation protocol to verify a transaction (e.g., by performing one or more of the operations described herein). Upon verification, the transaction node 104 can store data regarding the transaction locally, either instead of or in addition to storing the data on a distributed ledger or network-enabled database. In some implementations, the transaction node 104 can store data regarding the transaction locally, and additionally broadcast the data to one or more other components of the system 100 for storage (e.g., on a distributed ledger 150 and/or some other data store).

In some implementations, at least some of the user devices that are used to perform transactions (e.g., the transaction nodes 104, sender nodes, receptor notes, etc.) can store a local record of one or more of the transactions performed by those devices with other devices. Further, the devices can conduct transactions with one another in a peer-to-peer manner (e.g., directly with one another, rather than through an intermediary), and exchange information regarding the transactions in a peer-to-peer manner (e.g., by transmitting information regarding transactions directly to other user devices for recordation and storage).

Further, in some implementations, at least some of the user devices that are used to perform transactions (e.g., the transaction nodes 104, sender nodes, receptor notes, etc.) can store a local record of one or more of the transactions performed by those devices with other devices. Further, each of these devices can transmit a record of those transactions to a distributed ledger for storage and publication. This can be beneficial, for example, in enabling users to publicly review each of the transactions performed by the users of the system in a transparent manner.

Further, although example transactions are described above, in practice, the system 100 can facilitate the exchange of any property, services, and/or other transaction values between entities. As examples, the system 100 can be used to perform or otherwise record information regarding an exchange of any combination of items of property, services, currencies or electronic tokens (e.g., fiat currency, cryptocurrency, fungible tokens, non-fungible tokens, etc.), either according to a unilateral transaction or according to a bilateral transaction. Further, in some implementations, the system 100 can be used to perform or otherwise record information regarding an exchange of one type of currency or electronic token for another (e.g., an exchange of one non-fungible token for another non-fungible token, an exchange of one currency for another, an exchange of a non-fungible token for a currency, etc.). In practice, other types of transactions are also possible, either instead of or in addition to those described herein.

As an example, the system 100 can be used to perform or otherwise record information regarding an exchange of media content and/or communication, such as video content, audio content, text content, video game content, virtual reality content, augmented reality content (e.g., "metaverse" content), and/or peer-to-peer (P2P) content between users. For instance, the system 100 can be used to perform or otherwise record information regarding an exchange of media content produced by journalists, advertisers, content creators, etc. for compensation provided by one or more viewers, readers, subscribers, etc. As another example, the system 100 can be used to perform or otherwise record information regarding an exchange of music, art, and/or funding (e.g., crowdsourced funding), humanitarian aid, etc.

As another example, the system 100 can be used to record information regarding an exchange of services between users (e.g., in accordance with a "gig economy"). For instance, a smart contract can specify a service that is offered by a user, and can include details regarding the offered service (e.g., cost, specific services performed, length of time needed to perform the services, the location(s) at which the services can be performed, the time(s) at which the services can be performed, etc.). Other users can search for services offered by others, and provide value to the particular users in exchange for the performance of those services via a proof of reception validation protocol (e.g., as described herein). Example services include legal services, accounting or other financial services, grooming or stylist services, driving services (e.g., taxi services or ride share services), cooking services, delivery services, rental services (e.g., rentals of vehicles, homes, apartments, etc.), or any other service that can be provided by one user to another.

In some implementations, the system 100 can be used to facilitate the performance of activities by entities according to a permission-based process. For instance, using the system 100, a first entity can permit a second party to perform a particular action, upon the second party proving that they have permission to perform that action.

As an example, using the system 100, a government can permit a user to vote (e.g., provide value to the user), upon the user proving that they have the required citizenship credentials for using the system 100. For instance, as proof, the user can provide information that can be validated using the distributed ledger 150, such as a social security number or other information that can be used to determine whether a user is a citizen. In some implementations, proof can be provided by a third party system 122 (e.g., a government database) via the data interface system 120.

As another example, using the system 100, a government can provide government benefits to a user (e.g., provide value to the user, such as welfare benefits, healthcare benefits, subsidies, assistance, etc.), upon the user proving that they satisfied the eligibility requirements for receiving the benefits using the system 100. For instance, as proof, the user can provide information that can be validated using the distributed ledger 150, such as a social security number or other information that can be used to determine whether a user is eligible for benefits. In some implementations, proof can be provided by a third party system 122 (e.g., a government database) via the data interface system 120.

In some implementations, the system 100 can be used to facilitate the performance of other government activities.

As an example, a government can provide incentives to a user (e.g., provide value to the user), in exchange for the user providing census information to the government (e.g., completing a census form with the user's demographic information).

As another example, a government can approve an entity's zoning request (e.g., provide value to the user) based on the entity satisfying certain requirements. For instance, the government can create a smart contract that (i) specifies the requirements for approval of the zoning request, and (ii) approves the zoning request (e.g., programmatically) upon satisfaction of the requirements. In some implementations, an entity can satisfy the requirements, at least in part, by providing identifying information (e.g., the entity's social security number, employer identification number, etc.), providing payment, or providing any other data in support of the request. In some implementations, proof can be provided by the third party system 122 (e.g., a government database) via the data interface system 120. In some implementations, payment also can be provided by a third party system 122 (e.g., a financial institution) via the data interface system 120.

As another example, a government can approve an entity's business registration (e.g., provide value to the user) based on the entity satisfying certain requirements. For instance, the government can create a smart contract that (i) specifies the requirements for approval of the business registration, and (ii) approves the business registration (e.g., programmatically) upon satisfaction of the requirements. In some implementations, an entity can satisfy the requirements, at least in part, by providing identifying information (e.g., the entity's social security number, employer identification number, etc.), providing payment, or providing any other data in support of the registration. In some implementations, proof can be provided by the third party system 122 (e.g., a government database) via the data interface system 120. In some implementations, payment also can be provided by a third party system 122 (e.g., a financial institution) via the data interface system 120.

As another example, using the system 100, a government can provide emergency services to a user (e.g., provide value to the user, such as ambulance services, firefighting services, police services, etc.) upon the user providing identification information (e.g., social security number), location information, and/or information regarding the emergency. In some implementations, proof can be provided by the third party system 122 (e.g., a government database) via the data interface system 120.

As another example, using the system 100, a government can provide value to a user in exchange for the user depositing garbage or refuse into collection receptacle (e.g., a garbage bin). For instance, the collection receptacle can include (or otherwise communicate with) a transaction node that operates according to a proof of reception validation protocol. Upon detecting a user depositing garbage or refuse into the collection bin, the collection bin can identify the user (e.g., based on identifying information provided to the user to the transaction node and/or collection bin), and provide value to the user based on the deposited garbage or refuse. Example value includes digital currency and/or redeemable credits for purchasing items (e.g., food) or services. This can be beneficial, for example, in incentivizing users to clean up public areas.

In some implementations, a transaction node can provide a user with different values, depending on the type and/or quantity of garbage or refuse that is deposited into a collection receptacle. For example, the collection bin can weigh the garbage and/or determine a volume of the garbage, and select a value based on the weight and/or volume.

In some implementations, a transaction node can verify a user's identity based on biometric information, such as fingerprints, palm prints, images or scans of a person's face, images or scans of a person's eyes, among others.

In some implementations, the collection receptacle and the transaction node can be implemented as an Internet of Things (IoT) device that is communicatively coupled to a network (e.g., via a wired or wireless network connection).

In some implementations, the system 100 can be used to facilitate the exchange of tokens representing any value and/or service. As an example, a cryptocurrency system can generate tokens representing carbon credits or carbon offsets. For instance, each token can represent authorization (e.g., issued by an authority or regulator, such as a government and/or private entity) for the owner of the token to emit a certain amount of carbon dioxide or other greenhouse gases into the atmosphere. As an example, one token can permit the owner of the token to emit one ton of carbon dioxide or the equivalent in other greenhouse gases. In some implementations, an entity can be allotted a particular amount of tokens by an authority or regulator, either for free or in exchange for a particular amount of value (e.g., a carbon "tax" that places a price tag put on fossil fuel emissions to disincentivize their use and to promote a switch to green energy). The tokens can be traded with other entities (e.g., in a carbon market) and/or exchanged for other value (e.g., fiat currency, cryptocurrency, fungible tokens, non-fungible tokens, tax credits or deductions, etc.), such as in accordance with a proof of reception validation protocol.

In some implementations, an authority or regulator can measure the amount of carbon dioxide and/or other greenhouse gases emitted by a particular entity, and deduct a corresponding number of tokens from an entity's holdings. In some implementations, an Internet of Things (IoT) device can be used to measure emissions by a facility or property of the entity (e.g., a manufacturing plant, building, farm, etc.), and provide measurement data to a transaction node of an authority or regulator to determine an appropriate number of tokens to deduct from the holdings of that entity.

In some implementations, an IoT device can measure emissions by an entity's facility or property, and provide the measurements in real time (or approximately real time) to another transaction node (e.g., to facilitate the deduction of tokens by the transaction node in real time). In some implementations, an IoT device can measure carbon emissions and provide the measurements to another transaction node according to a delay (e.g., to facilitate the deduction of tokens by the transaction node in non-real time).

In some implementations, carbon emission reduction can be determined by measuring the carbon emissions during two different time periods, and determining a reduction in the carbon emissions from the earliest time period to the later time period.

In some implementations, the system 100 can be used to facilitate the exchange of content using a social media platform.

As an example, each user of a social media platform can be associated with a respective transaction node 104. Further, each user can store content (on their respective transaction node 104, and propose transactions for sharing that content with others using the distributed ledger 150. Content can include any combination of video, audio, images, text, etc. In some implementations, content can include one or more messages composed by a user. In some implementations, content can include media generated or created by the user. For instance, using his transaction node 104, a first user can generate a smart contract specifying the content to be shared with one or more other users, and the terms or conditions for accessing that content. For example, the smart contract can specify that only a specific subset of users can access the content. Further, the smart contract can specify that those users prove their identities by providing certain information (e.g., biometric information, cryptographic signatures, user credentials, etc.) As another example, the smart contract can specify that the content can only be accessed during a certain timeframe. As another example, the smart contract can specify that other users must provide a particular amount of value to the first user in order to access the content. Information regarding the proposed transaction can be stored in the distributed ledger 150.

Upon another user accepting the transaction (e.g., using his respective transaction node 104), the system 100 can validate the transaction and record the transaction using the proof of reception validation protocol, as described above.

For example, a second user can accept the transaction. In response, using the proof of reception validation protocol, the transaction nodes of the users can validate the terms and conditions of the smart contract. As described above, this validation can be performed based on information stored in the distributed ledger 150 (e.g., information regarding the content and value associated with each transaction node and user, previous transactions conducted between the transaction nodes and users, etc.). Further, this validation can be performed based on information provided by one or more users (e.g., by providing biometric information, cryptographic signatures, user credentials, or other information that validates the user's identity).

Upon validation of the transaction by the transaction nodes 104, the system 100 can conduct the transaction. For example, the transaction node 104 associated with the first user can provide the specified content to the transaction node 104 associated with the second user. Further, the transaction node 104 associated with the second user can provide the specified value (if any) to the transaction node 104 associated with the first user.

In some implementations, the system 100 can be used to facilitate communications using satellites.

Figure 7A:
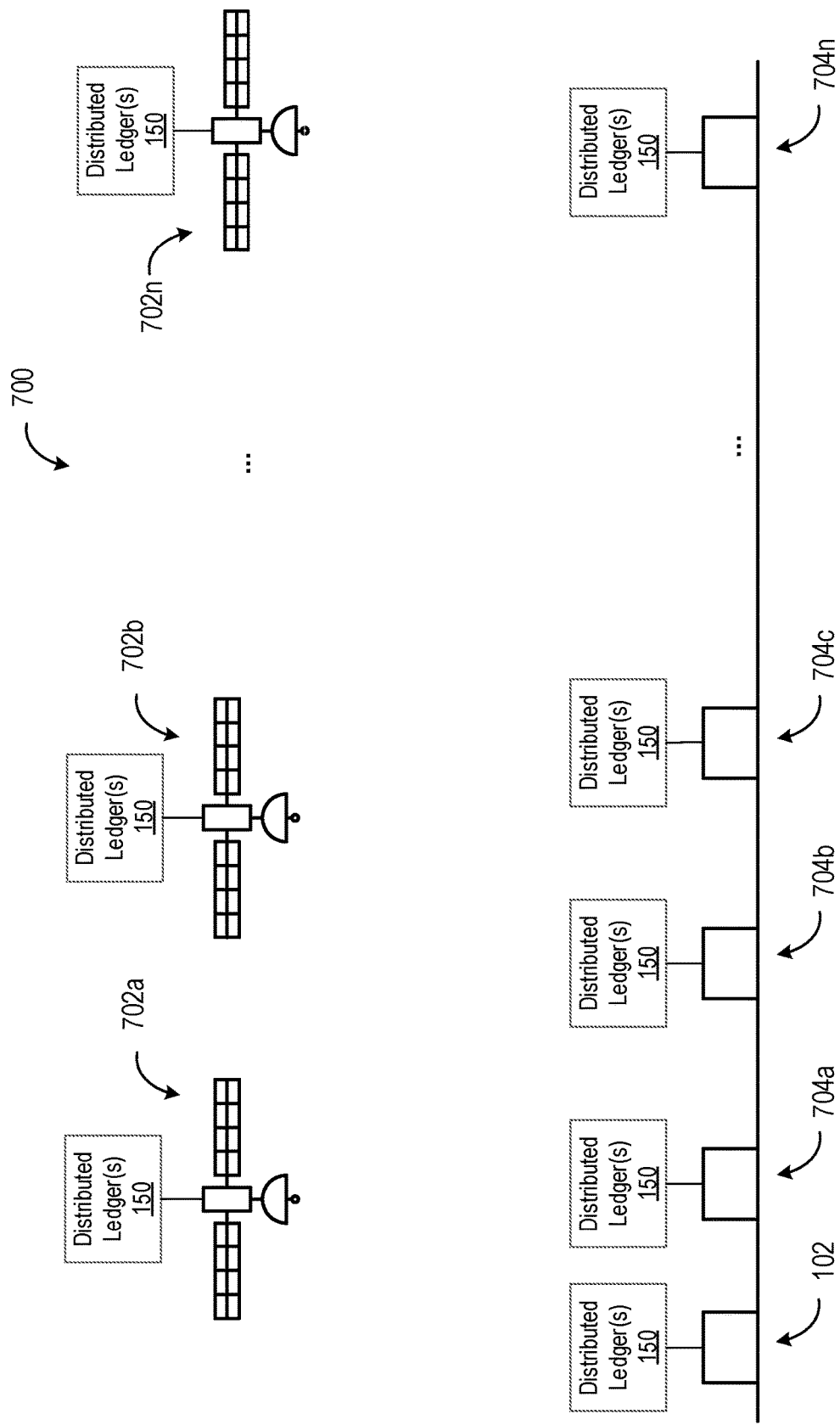
FIG. 7A is a diagram of an example satellite system.

FIG. 7A shows an example satellite system 700 including several orbiting satellites 702a-702n and several ground stations 704a-704n. The satellites 702a-702n communicatively couple the ground stations 704a-704n to one another by relaying signals (e.g., wireless signals, such as radio frequency signals) between the ground stations 704a-704n. For example, the ground station 704a can communicate with the ground station 704b by transmitting signals to the satellite 702a, which relays the signals to the ground station 704b (e.g., either directly, or indirectly using one or more other satellites 702b-702n as intermediaries). As another example, the ground station 704b can communicate with the ground station 704c by transmitting signals to the satellite 702b, which relays the signals to the ground station 704c (e.g., either directly, or indirectly using one or more other satellites 702a and 702c-702n as intermediaries).

Each of the ground stations 704a-704n and satellites 702a-702n can operate as transaction nodes 104 (e.g., in a similar manner as discussed above with reference to the system 100). For instance, at least some of the ground stations 704a-704n and/or satellites 702a-702n can store and maintain instances of a distributed ledger that stores information regarding previously conducted transactions and/or proposed new transactions between them. Further, using the distributed transaction network 102, the ground stations 704a-704n and/or satellites 702a-702n can facilitate the performance of electronic transactions according to a proof of reception validation protocol, whereby a potential recipient of value from the transaction validates one or more aspects of the transaction prior to receiving the value. Further, the recipient of value can record information regarding the successful completion of the transaction in the distributed ledger and/or other data store, such that information can be retrieved by others.

As an example, each of the satellites 702a-702n may be associated with a particular allotment of network resources with which it transmits and/or receives data from the ground stations 704a-704n and/or the other satellites. An example network resources include specific frequency bands or bandwidth for transmitting and/or receiving wireless signals at certain times and/or geographical locations, processing power (e.g., provided by computer processors, such as central processing units, graphics processing units, etc.), memory (e.g., provided by computer memory devices), storage (e.g., provided by computer storage devices, etc.), and/or any other resource for transmitting and/or receiving data. At least some of the network resources can be recorded by the system 100 (e.g., using the distributed ledger 150 and/or other stores of data).

The satellites 702a-702n can coordinate the processing of signals with one another using the distributed transaction network 102 and/or the distributed ledger 150, such that the satellites 702a-702n do not exceed their allotted network resources and/or operate more efficiently or effectively.

For example, when a first satellite 702a is nearing the limit of its allotted network resources, the first satellite 702a can propose a transaction to one or more other satellites 702b-702n in which (i) the one or more other satellites 702b-702n assist in the processing of signals for the first satellite 702a, in exchange for (ii) a particular amount of value (e.g., monetary payment, tokens, credits, etc.). The proposed transaction can be specified in the form of a smart contract in the distributed ledger 150 (e.g., as described above). For example, a smart contract can specify (i) a set of network resources that the first satellite 702a would like to obtain, and (ii) the value that the first satellite 702a is offering in exchange for those network resources (e.g., a "rental" fee offered in exchange for those network resources).

Further, the smart contract can specify any of the other terms or conditions of the transaction (e.g., as described above). For example, the smart contract can specify that the network resources be provided with respect to certain geographical areas (e.g., certain coverage areas of the satellites) and at certain times (e.g., a specific time interval or date). As another example, the smart contract can specify that the network resources be provided by specific satellites.

Upon another satellite accepting the transaction request, the system 700 can validate the transaction and record the transaction using the proof of reception validation protocol, as described above.

For example, a second satellite 702b can accept the proposed transaction. In response, using the proof of reception validation protocol, the first satellite 702a can validate that the second first satellite 702b has the network resources specified by the smart contract, and the second satellite 702b can validate that the first satellite 702a is in possession with the specified value (e.g., monetary payment, tokens, credits, etc.). As described above, this validation can be performed based on information stored in the distributed ledger 150 and/or any other data store (e.g., a local data store, network enabled data storage, etc.). Example information includes information regarding the network resources and value associated with each satellite, previous transactions conducted between the satellites, etc.

As another example, the second satellite 702b can validate the identity of the first satellite 702a, and the first satellite 702a can validate the identity of the second satellite 702b. As another example, the first satellite 702a and/or the second satellite 702b can validate any of the other terms or conditions specified by the smart contract.

Upon validation of the transaction by the first satellite 702a and the second satellite 702b, the system 700 can coordinate the processing of signals according to the transaction. For example, the first satellite 702a can transmit (e.g., directly or indirectly) at least some data to the second satellite 702b for processing, transmission, and/or storage. As another example, the first satellite 702a, the second satellite 702b, the distributed transaction network 102, and/or any other component of the satellite system 700 can instruct at least some of the ground stations 704a-704n that are configured to transmit signals to the first satellite 702a to transmit signals to the second satellite 702b instead. As another example, the first satellite 702a, the second satellite 702b, the distributed transaction network 102, and/or any other component of the satellite system 700 can instruct at least some of the satellites 702c-702n that are configured to transmit signals to the first satellite 702a to transmit signals to the second satellite 702b instead.

In some implementations, upon validation of the transaction by the first satellite 702a and the second satellite 702b, the first satellite 702a and the second satellite 702b can coordinate the processing of signals according to the transaction, without further input from a centralized control center (e.g., a centralized ground control station). Instead, the first satellite 702a and the second satellite 702b can coordinate the processing with one another in an ad hoc, peer-to-peer, and/or decentralized manner.

Further, the first satellite 702a and/or the second satellite 702b can record information regarding the transaction on the distributed ledger 150. For example, the first satellite 702a and/or the second satellite 702b can record the parties to the transaction, the value that was exchanged between them, the time at which the transaction occurred, the terms and conditions of the transaction, etc.

In some implementations, the system 100 can also be used to facilitate communications using terrestrial communications systems. As an example, referring to FIG. 7A, at least some of the ground stations 704a-704n can be communicatively coupled to one another via terrestrial networks (e.g., a terrestrial wired network, a terrestrial wireless network, etc.). Further, the ground stations 704a-704n can operate as transaction nodes 104 (e.g., in a similar manner as discussed above with reference to the system 100) to facilitate the exchange and processing of data. For instance, at least some of the ground stations 704a-704n can store and maintain instances of a distributed ledger that stores information regarding previously conducted transactions and/or proposed new transactions between them. Further, using the distributed transaction network 102 and the ground stations 704a-704n can facilitate the performance of electronic transactions according to a proof of reception validation protocol, whereby a potential recipient of value from the transaction validates one or more aspects of the transaction prior to receiving the value. Further, the recipient of value can record information regarding the successful completion of the transaction in the distributed ledger and/or other data store, such that information can be retrieved by others.

As an example, each of the ground stations 704a-704n may be associated with a particular allotment of network resources with which it transmits and/receives data from the other ground stations 704a-704n. An example network resources include specific frequency bands or bandwidth for transmitting and/or receiving wired or wireless signals at certain times and/or geographical locations, physical infrastructure for transmitting and/or receiving wireless signals (e.g., cables, wires, wireless antennas, etc.), processing power (e.g., provided by computer processors, such as central processing units, graphics processing units, etc.), memory (e.g., provided by computer memory devices), storage (e.g., provided by computer storage devices, etc.), and/or any other resource for transmitting and/or receiving data. At least some of the network resources can be recorded by the system 100 (e.g., using the distributed ledger 150 and/or other stores of data).

The ground stations 704a-704n can coordinate the processing of signals with one another using the distributed transaction network 102 and/or the distributed ledger 150, such that the ground stations 704a-704n do not exceed their allotted network resources and/or operate more efficiently or effectively.

For example, when a first ground station 704a is nearing the limit of its allotted network resources, the first ground station 704a can propose a transaction to one or more other ground stations 704a-704n in which (i) the one or more other ground stations 704a-704n assist in the processing of signals for the first ground station 704a, in exchange for (ii) a particular amount of value (e.g., monetary payment, tokens, credits, etc.). The proposed transaction can be specified in the form of a smart contract in the distributed ledger 150 (e.g., as described above). For example, a smart contract can specify (i) a set of network resources that the first ground station 704a would like to obtain, and (ii) the value that the first ground station 704a is offering in exchange for those network resources (e.g., a "rental" fee offered in exchange for those network resources).

Further, the smart contract can specify any of the other terms or conditions of the transaction (e.g., as described above). For example, the smart contract can specify that the network resources be provided with respect to certain geographical areas (e.g., certain service areas of the ground stations) and at certain times (e.g., a specific time interval or date). As another example, the smart contract can specify that the network resources be provided by specific ground stations.

Upon another ground station accepting the transaction request, the system 700 can validate the transaction and record the transaction using the proof of reception validation protocol, as described above.

For example, a second ground station 704b can accept the proposed transaction. In response, using the proof of reception validation protocol, the first ground station 704a can validate that the second ground station 704b has the network resources specified by the smart contract, and the second ground station 704b can validate that the first ground station 704a is in possession with the specified value (e.g., monetary payment, tokens, credits, etc.). As described above, this validation can be performed based on information stored in the distributed ledger 150 and/or any other data store (e.g., a local data store, network enabled data storage, etc.). Example information includes information regarding the network resources and value associated with each ground station, previous transactions conducted between the ground stations, etc.

As another example, the second ground station 704b can validate the identity of the first ground station 704a, and the first ground station 704a can validate the identity of the second ground station 704b. As another example, the first ground station 704a and/or the second ground station 704b can validate any of the other terms or conditions specified by the smart contract.

Upon validation of the transaction by the first ground station 704a and the second ground station 704b, the system 700 can coordinate the processing of signals according to the transaction. For example, the first ground station 704a can transmit (e.g., directly or indirectly) at least some data to the second ground station 704b for processing, transmission, and/or storage. As another example, the first ground station 704a, the second ground station 704b, the distributed transaction network 102, and/or any other component of the system 700 can instruct at least some of the ground stations 704c-704n that are configured to transmit data to the first ground station 704a to transmit signals to the second ground station 704b instead.

In some implementations, upon validation of the transaction by the first ground station 704a and the second ground station 704b, the first ground station 704a and the second ground station 704b can coordinate the processing of signals according to the transaction, without further input from a centralized control center (e.g., a centralized control station). Instead, the first ground station 704a and the second ground station 704b can coordinate the processing with one another in an ad hoc, peer-to-peer, and/or decentralized manner.

Further, the first ground station 704a and/or the second ground station 704b can record information regarding the transaction on the distributed ledger 150. For example, the first ground station 704a and/or the second ground station 704b can record the parties to the transaction, the value that was exchanged between them, the time at which the transaction occurred, the terms and conditions of the transaction, etc.

In some implementations, data can be encrypted such that only authorized ones of the satellite 702a-702n and/or ground stations 704a-704n can access the encrypted data. In some implementations, a smart contract can be used to specify that particular ones of the satellite 702a-702n and/or ground stations 704a-704n are authorized to access a particular instance of data. Further, the specified satellite 702a-702n and/or ground stations 704a-704n can verify their identity by performing one or more of the validation techniques described herein (e.g., by providing information to verify "PoRtraits" specified by the smart contract).

In some implementations, information can be stored on one or more distributed ledgers 150 maintained by the distributed transaction network 102, the satellites 702a-702n, and/or the ground stations 704a-704n. In some implementations, the satellites 702a-702n and/or the ground stations 704a-704n can store information locally (e.g., on a locally maintained distributed ledger 150 or other data store), and broadcast the information to one or more other satellites 702a-702n and/or the ground stations 704a-704n and/or the distributed transaction network 102. In some implementations, the satellites 702a-702n and/or the ground stations 704a-704n can store information remotely (e.g., on a remotely maintained distributed ledger 150 or other data store).

In some implementations, the ground stations 704a-704n and/or satellites 702a-702n can transmit data to one another optically (e.g., using one or more laser emitters and laser detectors). In some implementations, the ground stations 704a-704n and/or satellites 702a-702n can transmit data to one another through the transmission of radio signals (e.g., using one or more radio transmitters and receivers).

In some implementations, the ground stations 704a-704n and/or satellites 702a-702n can be deployed having the functionality described herein (e.g., to facilitate the exchange of data using a proof of reception validation protocol at the onset of deployment). In some implementations, the ground stations 704a-704n and/or satellites 702a-702n can be deployed without at least some of the functionality described herein, and can be modified (e.g., via software and/or hardware modifications) to facilitate the exchange of data using a proof of reception validation protocol subsequent to deployment.

Although FIG. 7A shows an example implementation of a proof of reception validation protocol with respect to a satellite system (e.g., having both satellites and ground stations), a proof of reception validation protocol can also be implemented with respect to other types of communications network. As an example, a proof of reception validation protocol can be used to facilitate the exchange of data in a terrestrial communications network (e.g., a communications network that exchanges data using ground-based transmitters and/or receivers, such as a cellular network). As another example, a proof of reception validation protocol can be used to facilitate the exchange of data in a Vehicle-to-Vehicle (V2V) communications network (e.g., a communications network that exchanges data between vehicles). As another example, a proof of reception validation protocol can be used to facilitate the exchange of data in Mobile-to-Mobile (M2M) communications network (e.g., a communications network that exchanges data between any type of mobile devices, such as vehicles, laptops, smartphones, wearable devices, tablet computers, etc.).

In some implementations, the system 100 can be used to facilitate operations of an industrial system, such as a factory, plant, warehouse, etc.

FIG. 7B shows an example industrial system 750 including several components 752a-752n. In general, each of the components 752a-752n is a respective system or device that performs operations as a part of an industrial process. As an example, the components 752a-752n can include sensors, control systems, computers, industrial tools, heating systems, cooling systems, ventilation systems, air conditioning systems, robots, conveyors, or any other system or device for performing at least a portion of an industrial process. Example operations include turning on the component, starting the component, pausing the component, turning off the component, performing a specific task using the component, changing an operating parameter of the component, moving the component, actuating one or more parts of the component, or performing any other action using the component.

Each of the components 752a-752n can operate as transaction nodes 104 (e.g., in a similar manner as discussed above with reference to the system 100). For instance, at least some of the components 752a-752n store and maintain instances of a distributed ledger that stores information regarding previously conducted transactions and/or proposed new transactions between them. Further, using the distributed transaction network 102, the components 752a-752n can facilitate the performance of electronic transactions according to a proof of reception validation protocol, whereby a potential recipient of value from the transaction validates one or more aspects of the transaction prior to receiving the value. Further, the recipient of value can record information regarding the successful completion of the transaction in the distributed ledger and/or other data store, such that information can be retrieved by others.

As an example, each of the components 752a-752n can have certain capabilities or functions. Further, the components 752a-752n can specify that it will perform certain operations in accordance with its capabilities or functions, upon satisfaction of certain conditions. These operations and conditions can be analogous to a proposed transaction, the details of which can be specified in the form of a smart contract in the distributed ledger 150.

Each of the components 752a-752n can "accept" transactions proposed by the other components 752a-752n using the proof of reception validation protocol, as described above. As an illustrative example, a first component can specify that it will perform a first operation, upon a second component providing certain information to the first component (e.g., a specific set of sensor data, a command, etc.). Upon the second component accepting the transaction, the first component can verify that the second component has provided the specified information, and if so, perform the first operation.

Further, the first component and/or the second component can record information regarding the transaction on the distributed ledger 150. For example, the first component and/or the second component can record the parties to the transaction, the operations that were performed as a part of the transaction, the information that was exchanged as a part of the transaction, the time at which the transaction occurred, etc.

In some implementations, information can be stored on one or more distributed ledgers 150 maintained by the distributed transaction network 102 and/or the components 752a-752n. In some implementations, the components 752a-752n can store information locally (e.g., on a locally maintained distributed ledger 150 or other data store), and broadcast the information to one or more other components 752a-752n and/or the distributed transaction network 102. In some implementations, the components 752a-752n can store information remotely (e.g., on a remotely maintained distributed ledger 150 or other data store).

In some implementations, transactions can be performed according to a proof of reception validation protocol through the exchange of text messages or chat messages between users. As an example, referring to FIG. 8, a first user (e.g., a "fan") can send a text message or chat message 802 proposing a transaction for media content (e.g., a song) created by a second user (e.g., a "performer") in exchange for monetary value. The second user can accept the first user's proposed transaction and provide the requested media content to the first user, in exchange for the monetary value (e.g., via a text message or chat message 804). Each of the aspects of the transaction (e.g., proposal, validation, transfer, recordable, etc.) can be performed using one or more of the techniques described herein.

Figure 8:
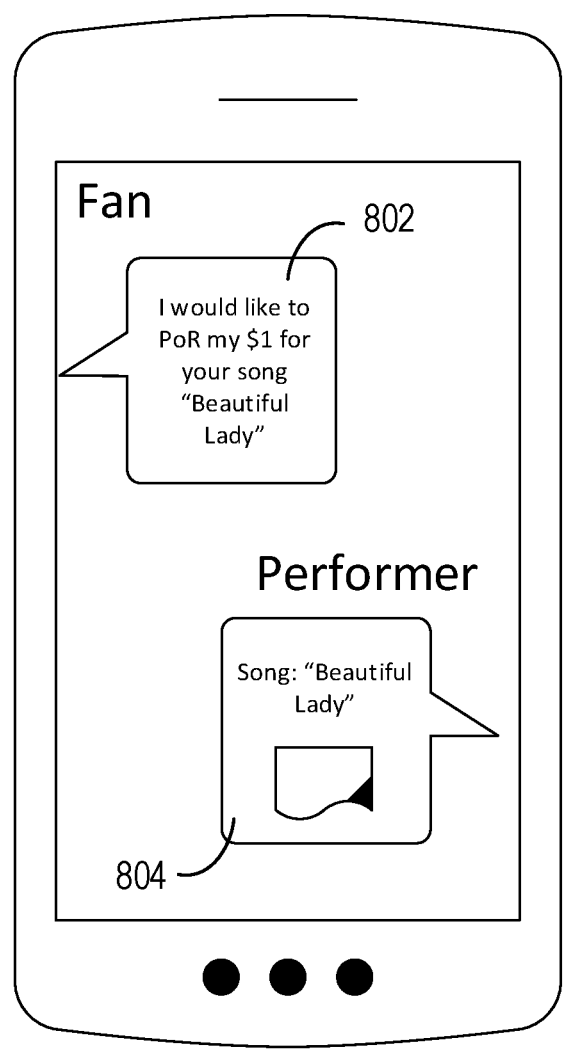
FIG. 8 is a diagram of an example technique for performing a transaction using text messages or chat messages.

In general, any media content can be exchanged in the manner shown in FIG. 8. Example media content includes text content, audio content, video content, image content, or any combination thereof. Further, any other type of item or property can be exchanged in the manner shown in FIG. 8, including physical property, digital property, services, or any other item or property described herein.

In some implementations, a user can install a software application (e.g., "PoRtable") onto one or more of the computer devices to facilitate performance of these tasks. For example, a user can install a software application that allows a user to send text and/or chat messages to one another, and to perform transactions with one another in accordance with a proof of reception consensus protocol (e.g., using the techniques and systems described herein).

In some implementations, the system 100 can be used to securely share sensitive information between users, such as medical information regarding one or more users. As an example, a first transaction node can be associated with a patient, and a second transaction node can be associated with a health care provider. The first transaction node can generate a smart contract specifying that medical information regarding the patient can be provided to the second transaction node, upon the second transaction node fulfilling certain requirements specified by the smart contract. This can be beneficial, for example, in enabling patients to better control their medical data, without relying on a third party. Further, this can be beneficial in protecting patients' personal data from exploitation by third parties (e.g., advertisers) who can access the data from databases outside of the patients' control. Further, this can be beneficial in reducing third-party data compliance costs for organizations, as patient data can be managed by each patient in a decentralized manner (e.g., using respective transaction nodes) rather than through a centralized database maintained by the organizations. Further, this can be beneficial in enabling organizations to better conform to data protection regulations such as the General Data Protection Regulation (GDPR), the Payment Card Industry Data Security Standard (PCI DSS), and the Health Insurance Portability and Accountability Act (HIPAA), which may otherwise by costly and complicated to conform to.

Example requirements include confirmation of the health care provider's identity, proof that the health care provider has satisfy certain regulatory requirements (e.g., requirements set forth by the Health Insurance Portability and Accountability Action, HIPAA), and/or any other requirements. Upon the second transaction node providing the required information to the first transaction node (e.g., via a proof of reception validation protocol), the first transaction node can provide the medical information to the second transaction node (e.g., via the proof of reception validation protocol).

In some implementations, the first transaction node can provide medical information to the second transaction node in real time or approximately real time (e.g., to allow the health care provider to determine information regarding the patient in real time or approximately real time).

Example medical information includes medical charts, images (e.g., x-ray images, magnetic resonance imaging (MRI) images, computed tomography (CT) images, ultrasound images, etc.), laboratory reports (e.g., blood test reports), medical histories, medical histories, insurance information, biometric information, and/or any other information pertaining to the health of a patient).

Further, the first transaction node can generate a smart contract specifying that other medical information regarding the patient can be provided to the first transaction node, upon the first transaction node fulfilling certain requirements specified by the smart contract. Example medical information includes information regarding a course of treatment performed (or to be performed) by the health care provider, medical prescribed and/or administered by the health care provider, new or updated medical information regarding the patient, etc.

Example requirements include confirmation of the patient's identity (e.g., biometric information), proof of insurance by the patient, and/or any other requirements. Upon the first transaction node providing the required information to the second transaction node (e.g., via a proof of reception validation protocol), the second transaction node can provide the information to the first transaction node (e.g., via the proof of reception validation protocol).

In some implementations, the second transaction node can provide medical information to the first transaction node in real time or approximately real time (e.g., to allow the patient to determine information regarding his care in real time or approximately real time). Although the exchange of medical data is described above, any other type of sensitive data can be exchanged in a similar manner (e.g., financial data, classified data, etc.).

In some implementations, the techniques described herein can be used to exchange data between users from a single database. In some implementations, the techniques described herein can be used to exchange data between users from multiple different databases.

In some implementations, the techniques described herein can be used to exchange content between users (e.g., messages include text, images, audio, video, or another other content) through a messaging application.

In some implementations, the techniques described herein can be used to exchange information to facilitate the operation of a Decentralized Autonomous Organization (DOA). For example, the techniques described herein can be used to exchange information that unique identifies users, such as biometric information, cryptographically signatures, user credentials, etc.). Users can be granted membership into a DAO based on the exchanged information.

In some implementations, using one or more data interface systems (e.g., "PoRtals"), such as using APIs, a transaction node (e.g., "PoRt") can store, validates, and/or transfers any value (e.g., "PoRtion") that the owner of the transaction node generates, proves, and/or requests across any database (e.g., "Portfolio") based on the transaction node's smart contracts or conditions (e.g., "PoRtraits"). For example, a transaction node that is used for messaging can store, validate, and/or transfer any message that the owner of the transaction node generates, proves, and/or requests across any messaging application (e.g., iMessage, WhatsApp, Telegram, etc.).

In some implementations, the techniques described herein can be used to facilitate institutional cryptocurrency transactions (e.g., transactions of cryptocurrency between institutional entities, such as cryptocurrency exchanges). As an example, a first transaction node can be operated by a first institutional entity, and a second transaction node can be operated by a second institutional entity. Using the techniques described herein, the first transaction node can transmit an amount of cryptocurrency to the second transaction node, in exchange for a particular amount of fiat currency. In some implementations, this exchange can be performed simultaneously and/or concurrently. In some implementations, this exchange can be performed using one or more data interface systems (e.g., "PoRtals") to facilitate the exchange of value across one or more third party systems (e.g., banking systems, cryptocurrency blockchains or networks such as the Bitcoin network, etc.).

As described above, in some implementations, a proof of reception validation protocol can be used to facilitate the exchange of services between users (e.g., in accordance with a "gig economy"). As an example, a first transaction node can be associated with a first user that is offering to perform a service to others (e.g., an offer to transport other users in a vehicle, such as in a ride share service). Further, a second transaction node can be associated with a second user that is interested in engaging with the first user for performance of that service. Using a proof of reception validation protocol, the first transaction node and second transaction node can conduct a transaction, whereby the first user performs the service in exchange for the second user providing a corresponding value (e.g., monetary value) to the first user. Further, a record of the transaction can be stored in a distributed ledger, on one or both of the transaction nodes locally, and/or on a centralized database (e.g., a database maintained by an organization or company that matches services provides or customers, such as an organization or company that operates a ride share service).

Example Processes

Figure 9:
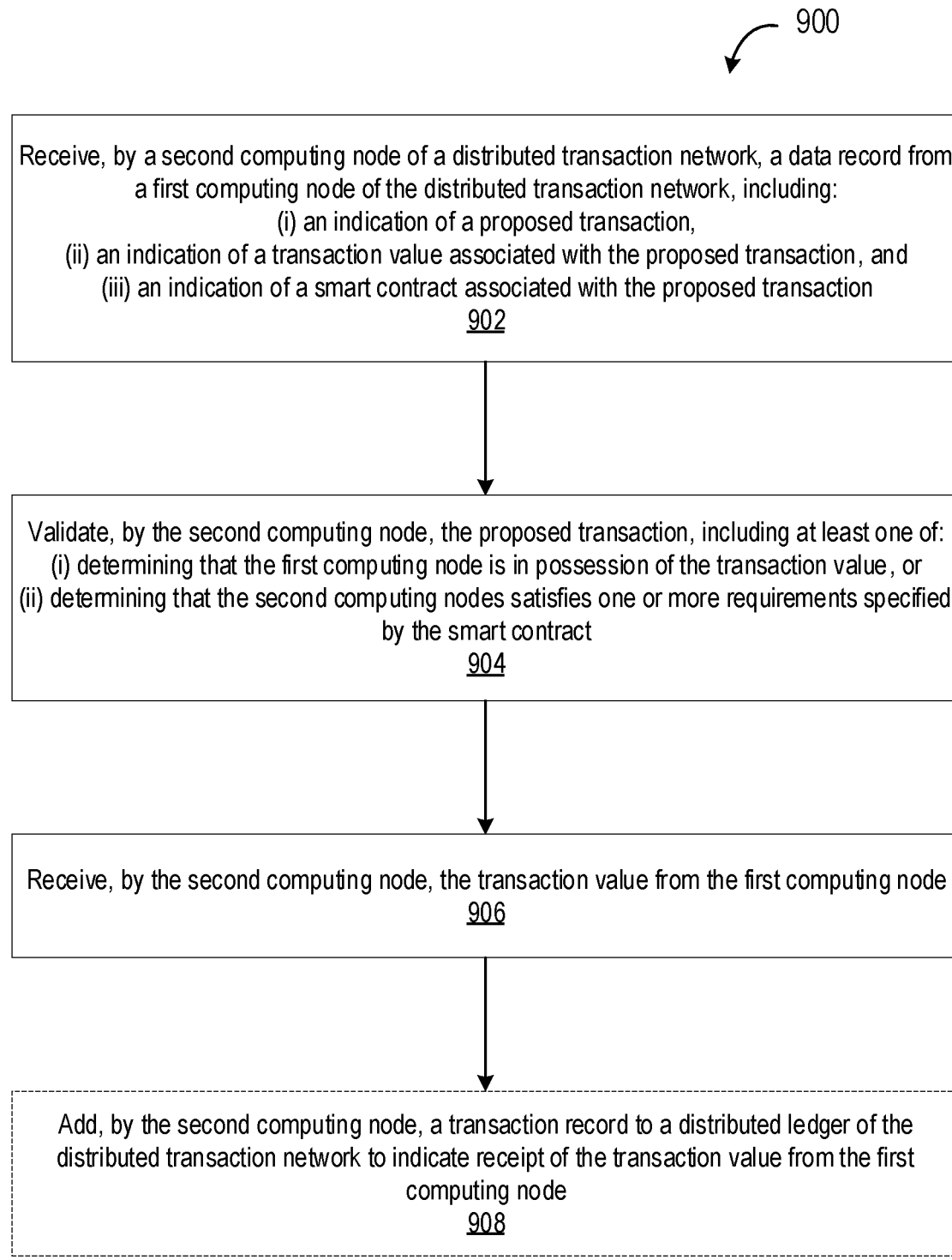
FIG. 9 is a flow chart diagram of another example process for operating a distributed transaction network, such as to facilitate the performance of one or more transactions according to a proof of reception validation protocol.

FIG. 9 shows an example process 900 for operating a distributed transaction network according to a proof of reception validation protocol. In some implementations, the process 900 can be performed by the system 100 described in this disclosure using one or more processors (e.g., using the processor or processors 1010 shown in FIG. 10).

In the process 900, a distributed transaction network includes at least a first computing node and a second computing node. The second computing node receives a data record from the first computing node (block 902). The data record includes (i) an indication of a proposed transaction, (ii) an indication of a transaction value associated with the proposed transaction, and (iii) an indication of a smart contract associated with the proposed transaction.

An example distributed transaction network is shown, for example, in FIG. 1. In some implementations, the first computing device may be referred to as a sender node, and the second computing device may be referred to as a receptor node.

In some implementations, receiving the data record can include receiving the data record directly from the first computing device (e.g., as shown and described with reference to FIGS. 2 and 3). In some implementations, receiving the data record can include retrieving the data record from a distributed ledger (e.g., as shown and described with reference to FIG. 4). In some implementations, receiving the data record can include retrieving the data record from a third party system (e.g., a database maintained by a government, financial institution, or any other party), such as via the data interface system 120.

In some implementations, the smart contract can include an indication of one or more criteria for receiving the transaction value. As an example, the one or more criteria can pertain to a characteristic of a user associated with the second computing node.

In some implementations, the transaction value can include an amount of cryptocurrency, physical property, a performance of a service, and/or one or more non-fungible tokens.

In some implementations, the transaction value can include network resources associated with one or more satellites (e.g., as described with reference to FIG. 7A).

In some implementations, the transaction value can include network resources associated with one or more terrestrial networks (e.g., as described with reference to FIG. 7A).

In some implementations, the transaction value can include network resources associated with at least one of a Vehicle-to-Vehicle (V2V) or Mobile-to-Mobile (M2M) network.

In some implementations, the transaction value can include a performance of an industrial operation (e.g., as described with reference to FIG. 7B).

In some implementations, the transaction value can include media content, such as video content, audio content, text content, video game content, virtual reality content, and/or augmented reality content.

In some implementations, the transaction value can include a government service.

In some implementations, the transaction value can include a delivery of goods in a supply chain.

In some implementations, the transaction value can include medical information regarding a patient.

The second computing node validates the proposed transaction (block 904). Validating the proposed transaction includes at least one of: (i) determining that the first computing node is in possession of the transaction value, or (ii) determining that the second computing nodes satisfies one or more requirements specified by the smart contract.

In some implementations, the proposed transaction can be validated based on data received from a first computer system different from the distributed transaction network. In some implementations, the data can be received from the first computer system via a second computer system providing an application programming interface (API).

Upon validating the proposed transaction, the second computing node performs one or more operations.

For example, upon validating the proposed transaction, the second computing node receives the transaction value from the first computing node (block 906). In some implementations, receiving the transaction value can include at least one of: (i) receiving funds from a financial account associated with the first computing node, or (ii) receiving one or more electronic tokens (e.g., cryptocurrency, digital currency, fungible tokens, non-fungible tokens, or other electronic representations of value) from the first computing node.

Further, upon validating the proposed transaction, the second computing node adds a transaction record to a distributed ledger of the distributed transaction network to indicate receipt of the transaction value from the first computing node (block 908). The distributed ledger is maintained on two or more computing nodes of the distributed transaction network. In some implementations, the distributed ledger can include a blockchain.

In some implementations, the distributed transaction network can include a plurality of computing nodes including the first computing node and the second computing node. Further, at least one of the computing nodes can include a computer device, a mobile device, or a wearable device.

In some implementations, the distributed ledger can be maintained by each of the computing nodes of the distributed transaction network.

In some implementations, upon validating the proposed transaction, the second computing node can also transmit a second data record to the first computing node. The second data record can include an indication of a second transaction value in accordance with the smart contract. Further, the second computing node can determine that the first computing node validated the second transaction value, and in response, transmit the second transaction value to the first computing node. The transaction record can further indicate transmission of the second transaction value to the first computing node. Example of these operations are shown and described, for instance, with reference to FIG. 3.

In some implementations, the smart contract can include an indication of the transaction value, an indication of a second transaction value, and a program. The program, when executed, causes the first computing node to automatically provide the transaction value to the second computing node, and the second computing node to automatically provide the second transaction value to the first computing node.

In some implementations, the program, when executed, causes the first computing node to automatically provide the transaction value to the second computing node simultaneously with the second computing node automatically providing the second transaction value to the first computing node.

In some implementations, the process 900 can also include preventing, by the second computing node, the first computing node from transferring the transaction value to one or more other computing nodes prior to the receipt of the transaction value by the second computing node. For example, the second computing node can cause the transaction value to be transmitted to an entity that is independent from the first computing node and the second computing node (e.g., to be held in escrow to ensure that the transaction value is transmitted to the second computing node). As another example, the second computing node can cause the system 100 to prevent the first transaction node from initiating, processing, and/or recording any additional transactions by the first computing node prior to the receipt of the transaction value by the second computing node. As another example, in some implementations, the second computing node can cause the system 100 to prevent the first computing node from conducting transactions with one or more other computing nodes prior to validation of the proposed transaction by the second computing node.

In some implementations, the second computing node can omit block 908 from the process 900. For example, the second computer node can refrain from adding a transaction record (e.g., indicating receipt of the transaction value) to the distributed ledger.

In some implementations, instead of (or in addition to) performance of block 908 (e.g., adding a transaction record to a distributed ledger), the second computing node can add a transaction record indicating receipt of the transaction value to a data store maintained locally on the second computing node. Further, the second computing node can transmit the transaction record to one or more additional nodes of the distributed transaction network (e.g., the first computing node and/or one or more other computing nodes).

In some implementations, instead of (or in addition to) performance of block 908 (e.g., adding a transaction record to a distributed ledger), the first computing node can add a transaction record indicating receipt of the transaction value to a data store maintained locally on the first computing node.

In some implementations, instead of (or in addition to) performance of block 908 (e.g., adding a transaction record to a distributed ledger), the first computing node can add a transaction record indicating receipt of the transaction value to database different from the first computing node and the second computing node. In some implementations, the database can be a centralized database that stores transaction records regarding multiple transactions performed by multiple computing nodes of the distributed transaction network.

In some implementations, the second computing node can validate the proposed transaction by determining that the first computing node is in possession of the transaction value, determining that the second computing node satisfies one or more requirements specified by the smart contract, receiving the transaction value from the first computing node, or any combination thereof. Further upon validating the proposed transaction, the second computer node can add a transaction record to a distributed ledger of the distributed transaction network to indicate receipt of the transaction value from the first computing node. In some implementations, the second computing node can also add a signature unique to the second computing node (e.g., a PoR signature, a cryptographic key, and/or biometric data) to the distributed ledger to finalize the validation and indicate the finality of the transaction. In some implementations, this validation can be performed without any additional validating actions performed by third parties (e.g., third party miners in a proof of work consensus mechanism and/or third party stakers in a proof of stake consensus mechanism).

Although example processes are described herein (e.g., with reference to FIGS. 2-6B and 9), these are merely illustrative examples. In practice, each of the processes can include other operations, either in addition to or instead of those described herein. Further, although the operations of each of the processes are described as being performed in a particular order, in practice, the order in which any of the operations are performed can vary, depending on the implementation. Further, in some implementations, any number of the operations can be performed concurrently or simultaneously with one another.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 can be implemented using digital electronic circuitry, or in computer software, firmware, or hardware, or in combinations of one or more of them. In another example, the processes 200, 300, 400, 500, 600, and 900 shown in FIGS. 3-6 and 9, respectively, can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of the computer program instructions, encoded on the computer storage medium for execution by, or to control the operation of, the data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices). In some implementations, one or more computer programs can be installed on one or more of the components described herein (e.g., transaction nodes 104, data interface system 120, third party systems 122, payment processor system 106, computing devices 110, satellites 702*a*-702*n*, ground stations 704*a*-704*n*, and/or components 752*a*-752*n*) to facilitate the performance of one or more of the operations described herein. In some implementations, one or more of the components described herein can be retrofitted after manufacture and/or deployment by installation of the one or more computer programs.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and the apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 10:
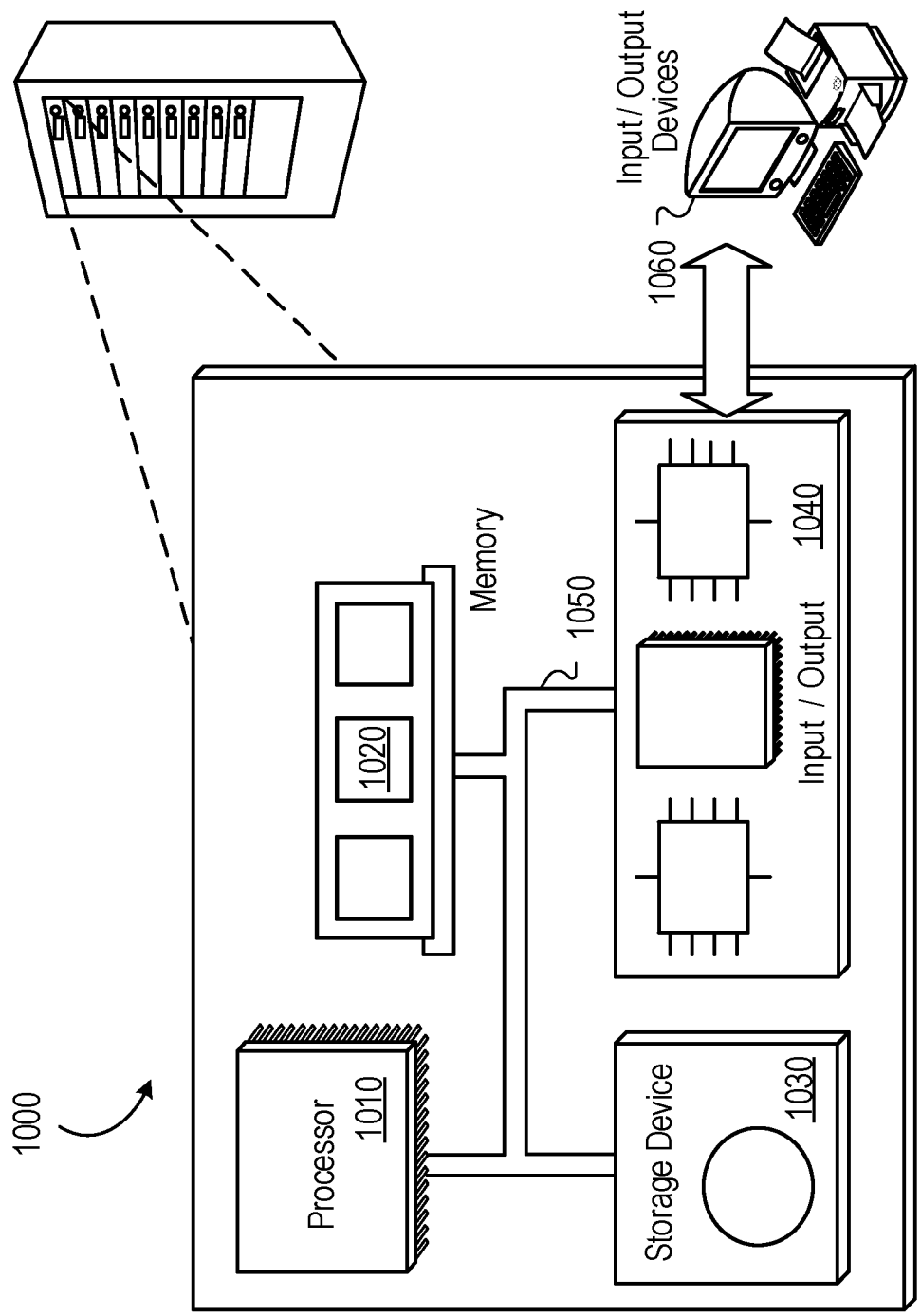
FIG. 10 is a schematic diagram of an example computer system.

FIG. 10 shows an example computer system 1000 that includes a processor 1010, a memory 1020, a storage device 1030 and an input/output device 1040. Each of the components 1010, 1020, 1030 and 1040 can be interconnected, for example, by a system bus 1050. The processor 1010 is capable of processing instructions for execution within the system 1000. In some implementations, the processor 1010 is a single-threaded processor, a multi-threaded processor, or another type of processor. The processor 1010 is capable of processing instructions stored in the memory 1020 or on the storage device 1030. The memory 1020 and the storage device 1030 can store information within the system 1000.

The input/output device 1040 provides input/output operations for the system 1000. In some implementations, the input/output device 1040 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 1060. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
  receiving, by a second computing node of a computerized distributed transaction network via a network connection, a data record from a first computing node of the computerized distributed transaction network, wherein the data record comprises:
    an indication of a proposed transaction,
    an indication of a transaction value associated with the proposed transaction, and
    an indication of a smart contract associated with the proposed transaction, wherein the smart contract indicates one or more terms, and wherein the smart contract comprises a computer program configured to automatically execute an aspect of the proposed transaction in accordance with the one or more terms;

validating, by the second computing node, the proposed transaction according to a decentralized computerized validation protocol, wherein validating the proposed transaction according to the decentralized computerized validation protocol comprises:

determining that the first computing node is in possession of the transaction value, and determining that the second computing node satisfies one or more requirements specified by the smart contract; and upon validating the proposed transaction:

receiving, by the second computing node, the transaction value from the first computing node, transmitting, by the second computing node, a second data record to the first computing node, wherein the second data record comprises an indication of a second transaction value in accordance with the smart contract, determining, by the second computing node, that the first computing node validated the second transaction value, responsive to determining that the first computing node validated the second transaction value, transmitting, by the second computing node, the second transaction value to the first computing node, and adding, by the second computing node, a transaction record to a distributed ledger of the computerized distributed transaction network indicating receipt of the transaction value from the first computing node in accordance with the smart contract, wherein the distributed ledger is maintained on two or more computing nodes of the computerized distributed transaction network.

2. The method of claim 1, wherein receiving the data record comprises: receiving the data record directly from the first computing node.

3. The method of claim 1, wherein receiving the data record comprises: retrieving the data record from the distributed ledger.

4. The method of claim 1, receiving the data record comprises: retrieving the data record from a database.

5. The method of claim 1, wherein the distributed ledger is maintained in each of the computing nodes of the computerized distributed transaction network.

6. The method of claim 1, wherein the distributed ledger comprises a blockchain.

7. The method of claim 1, wherein the transaction record comprises a signature unique to the second computing node.

8. The method of claim 7, wherein the signature comprises at least one of:

a cryptographic key, or biometric information.

9. A system comprising:

one or more processors; and one or more non-transitory computer readable media storing instructions that, when executed by the one or more processors, cause the one or more processors to perform the method of claim 1.

10. One or more non-transitory computer readable media storing instructions that, when executed by one or more processors, cause the one or more processors to perform the method of claim 1.

11. A method comprising:

receiving, by a second computing node of a computerized distributed transaction network via a network connection, a data record from a first computing node of the computerized distributed transaction network, wherein the data record comprises:

an indication of a proposed transaction, an indication of a transaction value associated with the proposed transaction, and an indication of a smart contract associated with the proposed transaction, wherein the smart contract comprises:

an indication of one or more terms, and a computer program configured to automatically execute an aspect of the proposed transaction in accordance with the one or more terms;

validating, by the second computing node, the proposed transaction according to a decentralized computerized validation protocol, wherein validating the proposed transaction according to the decentralized computerized validation protocol comprises:

determining that the first computing node is in possession of the transaction value, and determining that the second computing node satisfies one or more requirements specified by the smart contract; and upon validating the proposed transaction:

receiving, by the second computing node, the transaction value from the first computing node, transmitting a second data record to the first computing node, wherein the second data record comprises an indication of a second transaction value in accordance with the smart contract, determining that the first computing node validated the second transaction value, responsive to determining that the first computing node validated the second transaction value, transmitting the second transaction value to the first computing node, and generating a transaction record indicating (i) receipt of the transaction value from the first computing node and (ii) transmission of the second transaction value to the first computing node.

12. The method of claim 11, further comprising:

adding, by the second computing node, the transaction record to a distributed ledger of the computerized distributed transaction network, wherein the distributed ledger is maintained on two or more computing nodes of the computerized distributed transaction network.

13. The method of claim 12, wherein the transaction record comprises a signature unique to the second computing node.

14. The method of claim 11, further comprising:

adding, by the second computing node, the transaction record to a data store of the second computing node, wherein the data store is maintained locally on the second computing node.

15. The method of claim 14, further comprising:

transmitting the transaction record to one or more additional nodes of the computerized distributed transaction network.

16. The method of claim 14, wherein the transaction record comprises a signature unique to the second computing node.

17. The method of claim 11, further comprising:
adding, by the first computing node, transaction record to a data store of the first computing node, wherein the data store is maintained locally on the first computing node.

18. The method of claim 17, wherein the transaction record comprises a signature unique to the second computing node.

19. The method of claim 11, further comprising:
adding, by the second computing node, the transaction record to a database, wherein the database is different from the first computing node and the second computing node.

20. The method of claim 19, wherein the transaction record comprises a signature unique to the second computing node.

21. The method of claim 11, wherein receiving the data record comprises:
receiving the data record directly from the first computing node.

22. The method of claim 11, wherein receiving the data record comprises:
retrieving the data record from a distributed ledger.

23. The method of claim 11, receiving the data record comprises:
retrieving the data record from a database.

24. The method of claim 11, wherein smart contract comprises:
an indication of the transaction value,
an indication of a second transaction value, and
wherein the computer program is configured to cause:
the first computing node to automatically provide the transaction value to the second computing node, and
the second computing node to automatically provide the second transaction value to the first computing node.

25. The method of claim 24, wherein the program, when executed, causes:
the first computing node to automatically provide the transaction value to the second computing node simultaneously with the second computing node automatically providing the second transaction value to the first computing node.

26. The method of claim 11, wherein the computerized distributed transaction network comprises a plurality of computing nodes including the first computing node and the second computing node, and
wherein at least one of the computing nodes comprises:
a computer device,
a mobile device, or
a wearable device.

27. The method of claim 11, wherein the smart contract comprises:
an indication of one or more criteria for receiving the transaction value.

28. The method of claim 27, wherein the one or more criteria pertains to a characteristic of a user associated with the second computing node.

29. The method of claim 11, wherein receiving the transaction value comprises at least one of:
receiving funds from a financial account associated with the first computing node, or
receiving one or more electronic tokens from the first computing node.

30. The method of claim 11, wherein the transaction value comprises an amount of cryptocurrency.

31. The method of claim 11, wherein the transaction value comprises physical property.

32. The method of claim 11, wherein the transaction value comprises a performance of a service.

33. The method of claim 11, wherein the transaction value comprises one or more non-fungible tokens.

34. The method of claim 11, wherein the transaction value comprises network resources associated with one or more satellites.

35. The method of claim 11, wherein the transaction value comprises network resources associated with one or more terrestrial networks.

36. The method of claim 11, wherein the transaction value comprises network resources associated with at least one of a Vehicle-to-Vehicle (V2V) or Mobile-to-Mobile (M2M) network.

37. The method of claim 11, wherein the transaction value comprises a performance of an industrial operation.

38. The method of claim 11, wherein the transaction value comprises media content.

39. The method of claim 38, wherein the media content comprises at least one of:
video content,
audio content,
text content,
video game content,
virtual reality content, or
augmented reality content.

40. The method of claim 11, wherein the transaction value comprises a government service.

41. The method of claim 11, wherein the transaction value comprises a delivery of goods in a supply chain.

42. The method of claim 11, wherein the transaction value comprises medical information regarding a patient.

43. The method of claim 11, wherein the proposed transaction is validated based on data received from a first computer system different from the computerized distributed transaction network.

44. The method of claim 43, wherein the data is received from the first computer system via a second computer system providing an application programming interface (API).

45. The method of claim 11, further comprising:
preventing, by the second computing node, the first computing node from transferring the transaction value to one or more other computing nodes prior to the receipt of the transaction value by the second computing node.

46. The method of claim 11, wherein preventing the first computing node from transferring the transaction value to one or more other computing nodes prior to the receipt of the transaction value by the second computing node comprises:
causing the transaction value to be transmitted to an entity that is independent from the first computing node and the second computing node.

47. The method of claim 11, further comprising:
preventing, by the second computing node, the first computing node from initiating transactions with one or more other computing nodes prior to the receipt of the transaction value by the second computing node.

48. The method of claim 11, further comprising:
preventing, by the second computing node, the first computing node from conducting transactions with one or more other computing nodes prior to validation of the proposed transaction by the second computing node.

49. A system comprising:
one or more processors; and
one or more non-transitory computer readable media storing instructions that, when executed by the one or more processors, cause the one or more processors to perform the method of claim 11.

50. One or more non-transitory computer readable media storing instructions that, when executed by one or more processors, cause the one or more processors to perform the method of claim 11.

* * * * *